United States Patent
Ni et al.

(10) Patent No.: US 10,536,585 B2
(45) Date of Patent: Jan. 14, 2020

(54) CHARGING MEASUREMENT METHOD, APPARATUS, AND SYSTEM

(71) Applicant: HUAWEI TECHNOLOGIES CO., LTD., Shenzhen, Guangdong (CN)

(72) Inventors: Hui Ni, Beijing (CN); Yongcui Li, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/110,962

(22) Filed: Aug. 23, 2018

(65) Prior Publication Data

US 2018/0367675 A1    Dec. 20, 2018

Related U.S. Application Data

(63) Continuation of application No. PCT/CN2016/076229, filed on Mar. 14, 2016.

(51) Int. Cl.
*H04M 11/00* (2006.01)
*H04M 15/00* (2006.01)
*H04W 4/24* (2018.01)

(52) U.S. Cl.
CPC ........... *H04M 15/65* (2013.01); *H04M 15/66* (2013.01); *H04W 4/24* (2013.01)

(58) Field of Classification Search
CPC .... H04L 12/14; H04L 12/1407; H04M 15/62; H04M 15/65; H04M 15/66; H04W 4/24
USPC ........................................................ 455/406
See application file for complete search history.

(56) References Cited

U.S. PATENT DOCUMENTS

2016/0174055 A1    6/2016    Wang et al.
2017/0026523 A1    1/2017    Wang et al.

FOREIGN PATENT DOCUMENTS

| CN | 101325498 A | 12/2008 |
| CN | 101436940 A | 5/2009 |
| CN | 101488864 A | 7/2009 |
| CN | 104349298 A | 2/2015 |
| CN | 104378749 A | 2/2015 |
| EP | 2466866 A1 | 6/2012 |
| EP | 2863661 A1 | 4/2015 |

(Continued)

*Primary Examiner* — Charles T Shedrick
(74) *Attorney, Agent, or Firm* — Womble Bond Dickinson (US) LLP

(57) ABSTRACT

Embodiments of the present disclosure provide a charging measurement method, apparatus, and system. The method may include obtaining, by a control plane network element, a traffic flow charging parameter, the traffic flow charging parameter is an online charging parameter or an offline charging parameter. The method may also include determining a charging measurement parameter based on the traffic flow charging parameter, a charging measurement parameter determined based on the online charging parameter and a charging measurement parameter determined based on the offline charging parameter are charging measurement parameters in one charging measurement parameter set. Furthermore, the method may include sending a first message to a forwarding plane network element, where the first message carries the charging measurement parameter set and a traffic flow identifier, and the first message is used to trigger the forwarding plane network element to perform, based on the charging measurement parameter set, charging measurement on a traffic flow indicated by the traffic flow identifier.

20 Claims, 8 Drawing Sheets

(56) References Cited

FOREIGN PATENT DOCUMENTS

| WO | 2014040240 A1 | 3/2014 |
| WO | 2014169865 A1 | 10/2014 |

CHARGING MEASUREMENT METHOD, APPARATUS, AND SYSTEM

CROSS-REFERENCE TO RELATED APPLICATIONS

This application is a continuation of International Application No. PCT/CN2016/076229, filed on Mar. 14, 2016, the disclosure of which is hereby incorporated by reference in its entirety.

TECHNICAL FIELD

The present disclosure relates to the communications field, and in particular, to a charging measurement method, apparatus, and system.

BACKGROUND

In an evolved packet core (EPC) network, a logical network element service gateway (S-GW) and a packet data network gateway (P-GW) are usually deployed in an integrated way, forming a unified gateway (UGW). The UGW is further divided into a UGW-C (hereinafter referred to as a control plane gateway) and a UGW-U (hereinafter referred to as a forwarding plane gateway) based on an idea of control and forwarding separation.

Based on a current charging architecture defined by the 3rd Generation Partnership Project (3GPP), a gateway (for example, UGW) in an EPC network can normally provide a charging trigger function (CTF) in the charging architecture. Therefore, the CTF may be split based on the idea of control and forwarding separation, so that some functions of the CTF are placed on a control plane gateway, and the remaining functions of the CTF are placed on a forwarding plane gateway. In the charging architecture, an offline charging system and an online charging system are mutually independent charging systems; and on the forwarding plane gateway resulting from splitting of the CTF, there is a large difference in trigger conditions between the offline charging system and the online charging system. Therefore, an offline charging function and an online charging function need to be implemented separately on the forwarding plane gateway. Specifically, the control plane gateway may deliver both an offline charging parameter and an online charging parameter to the forwarding plane gateway, and the forwarding plane gateway collects charging statistics and reports charging results separately in offline and online statistics and reporting methods.

However, in the foregoing charging architecture, the forwarding plane gateway needs to separately implement the offline charging function and the online charging function, and therefore the offline charging function and the online charging function cannot be unified on the forwarding plane gateway. As a result, it is highly complex to implement the forwarding plane gateway and a control interface between the forwarding plane gateway and the control plane gateway.

SUMMARY

Embodiments of the present disclosure provide a charging measurement method, apparatus, and system, to enable an offline charging function and an online charging function to be unified in a forwarding plane network element, so as to reduce complexity of implementation of the forwarding plane network element and a control interface between the forwarding plane network element and the control plane network element.

To achieve the foregoing objective, the embodiments of the present disclosure use the following technical solutions:

According to a first aspect, an embodiment of the present disclosure provides a charging measurement method, including: obtaining, by a control plane network element, a traffic flow charging parameter, where the traffic flow charging parameter is an online charging parameter or an offline charging parameter; determining, by the control plane network element, a charging measurement parameter based on the traffic flow charging parameter, where a charging measurement parameter determined based on the online charging parameter and a charging measurement parameter determined based on the offline charging parameter are charging measurement parameters in one charging measurement parameter set; and sending, by the control plane network element, a first message to a forwarding plane network element, where the first message carries the charging measurement parameter set and a traffic flow identifier, and the first message is used to trigger the forwarding plane network element to perform, based on the charging measurement parameter set, charging measurement on a traffic flow indicated by the traffic flow identifier.

According to the charging measurement method provided in this embodiment of the present disclosure, regardless of an online charging mode or an offline charging mode, the control plane network element may determine the corresponding charging measurement parameter based on the obtained traffic flow charging parameter (that is, the online charging parameter or the offline charging parameter). In addition, the charging measurement parameter determined based on the online charging parameter and the charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, an offline charging function (a charging function corresponding to the offline charging mode) and an online charging function (a charging function corresponding to the online charging mode) can be unified in the forwarding plane network element, so that complexity of implementation of the forwarding plane network element and a control interface between the forwarding plane network element and the control plane network element can be reduced.

Optionally, in this embodiment of the present disclosure, the control plane network element may map the obtained traffic flow charging parameter to a corresponding charging measurement parameter (for example, a first charging measurement parameter) in a preset charging measurement parameter set, to obtain the foregoing charging measurement parameter (for example, including a parameter obtained by mapping the first charging measurement parameter, that is, a second charging measurement parameter).

Optionally, in this embodiment of the present disclosure, after the sending, by the control plane network element, a first message to a forwarding plane network element, the charging measurement method further includes:

receiving, by the control plane network element, a second message sent by the forwarding plane network element, where the second message carries a first charging measurement result parameter obtained after the forwarding plane network element performs charging measurement on the traffic flow and a first cause value parameter indicating a cause that has triggered the forwarding plane network element to send the second message.

Optionally, in this embodiment of the present disclosure, after the receiving, by the control plane network element, a second message sent by the forwarding plane network element, the charging measurement method further includes:

generating, by the control plane network element, a third message based on the first charging measurement result parameter and the first cause value parameter, where the third message carries a second charging measurement result parameter, a control plane charging parameter, and a second cause value parameter; and sending, by the control plane network element, the third message to a charging system.

In this embodiment of the present disclosure, after the forwarding plane network element performs charging measurement on the traffic flow based on the charging measurement parameter sent by the control plane network element, the forwarding plane network element may send a charging measurement result to the control plane network element, so that the control plane network element learns the charging measurement result. The control plane network element may also send the charging measurement result to the corresponding charging system, so that the charging system performs charging based on the charging measurement result. In this way, charging including offline charging and online charging on a traffic flow can be implemented.

For example, if the charging system is an offline charging system, the charging system may generate, based on the charging measurement result sent by the control plane network element, a charging data record corresponding to the traffic flow. If the charging system is an online charging system, the charging system may perform online charging quota management on the traffic flow based on the result of the charging measurement sent by the control plane network element.

Optionally, in this embodiment of the present disclosure, when the traffic flow charging parameter is the offline charging parameter, the obtaining, by a control plane network element, a traffic flow charging parameter includes:

obtaining, by the control plane network element, traffic flow charging characteristics; and obtaining, by the control plane network element, the offline charging parameter based on the traffic flow charging characteristics.

Optionally, in this embodiment of the present disclosure, when the traffic flow charging parameter is the online charging parameter, the obtaining, by a control plane network element, a traffic flow charging parameter includes:

receiving, by the control plane network element, a quota delivery message sent by the online charging system, where the quota delivery message carries the online charging parameter; and obtaining, by the control plane network element, the online charging parameter based on the quota delivery message.

In this embodiment of the present disclosure, the offline charging parameter and the online charging parameter may be obtained through the foregoing two optional implementations.

According to a second aspect, an embodiment of the present disclosure provides a charging measurement method, including:

sending, by a forwarding plane network element, a message to a control plane network element, where the message carries a first charging measurement result parameter obtained after the forwarding plane network element performs charging measurement on a traffic flow and a first cause value parameter indicating a value that has triggered the forwarding plane network element to send the message; and the message is the second message in the first aspect.

According to the charging measurement method provided in this embodiment of the present disclosure, when a condition indicated by the first cause value parameter is satisfied, the forwarding plane network element sends the second message to the control plane network element, so that the forwarding plane network element sends the second message only when sending the second message is required. In this way, working efficiency of the forwarding plane network element can be improved, and resources of the forwarding plane network element can be saved.

According to a third aspect, an embodiment of the present disclosure provides a control plane network element, including:

an obtaining unit, configured to obtain a traffic flow charging parameter, where the traffic flow charging parameter is an online charging parameter or an offline charging parameter; a determining unit, configured to determine a charging measurement parameter based on the traffic flow charging parameter, where a charging measurement parameter determined based on the online charging parameter and a charging measurement parameter determined based on the offline charging parameter are charging measurement parameters in one charging measurement parameter set; and a sending unit, configured to send a first message to a forwarding plane network element, where the first message carries the charging measurement parameter set determined by the determining unit and a traffic flow identifier, and the first message is used to trigger the forwarding plane network element to perform, based on the charging measurement parameter set, charging measurement on a traffic flow indicated by the traffic flow identifier.

According to the control plane network element provided in this embodiment of the present disclosure, regardless of an online charging mode or an offline charging mode, the control plane network element may determine the corresponding charging measurement parameter based on the obtained traffic flow charging parameter (that is, the online charging parameter or the offline charging parameter). In addition, the charging measurement parameter determined based on the online charging parameter and the charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, an offline charging function (a charging function corresponding to the offline charging mode) and an online charging function (a charging function corresponding to the online charging mode) can be unified in the forwarding plane network element, so that complexity of implementation of the forwarding plane network element and a control interface between the forwarding plane network element and the apparatus can be reduced.

Optionally, in this embodiment of the present disclosure, the control plane network element further includes a receiving unit, where the receiving unit is configured to receive a second message sent by the forwarding plane network element, where the second message carries a first charging measurement result parameter obtained after the forwarding plane network element performs charging measurement on the traffic flow and a first cause value parameter indicating a cause that has triggered the forwarding plane network element to send the second message.

Optionally, the determining unit is further configured to generate a third message based on the first charging measurement result parameter and the first cause value parameter, where the third message carries a second charging measurement result parameter, a control plane charging parameter, and a second cause value parameter; and the sending unit is further configured to send the third message generated by the determining unit to a charging system.

Optionally, when the traffic flow charging parameter is the offline charging parameter, the obtaining unit is specifically configured to obtain a traffic flow charging property and obtain the offline charging parameter based on the traffic flow charging property.

Optionally, when the traffic flow charging parameter is the online charging parameter, the obtaining unit is specifically configured to receive a quota delivery message sent by an online charging system, where the quota delivery message carries the online charging parameter; and obtain the online charging parameter based on the quota delivery message.

For technical effects brought by the optional implementations of the third aspect, refer to related description of the technical effects brought by the corresponding optional implementations of the first aspect, and details are not described herein again.

According to a fourth aspect, an embodiment of the present disclosure provides a forwarding plane network element, including:

a sending unit, configured to send a message to a control plane network element, where the message carries a first charging measurement result parameter obtained after the forwarding plane network element performs charging measurement on a traffic flow and a first cause value parameter indicating a value that has triggered the forwarding plane network element to send the message; and the message is the foregoing second message.

According to the forwarding plane network element provided in this embodiment of the present disclosure, when a condition indicated by the first cause value parameter is satisfied, the forwarding plane network element sends the second message to the control plane network element, so that the forwarding plane network element sends the second message only when sending the second message is required. In this way, working efficiency of the forwarding plane network element can be improved, and resources of the forwarding plane network element can be saved.

Optionally, in the first aspect and the third aspect, when the traffic flow charging parameter is the offline charging parameter, the charging system is an offline charging system, and the third message is a charging data record request message.

Optionally, in the first aspect and the third aspect, when the traffic flow charging parameter is the offline charging parameter, the charging measurement parameter includes at least one of a time limit parameter, an uplink/downlink volume limit parameter, and a rate change time parameter.

Correspondingly, when the traffic flow charging parameter is the offline charging parameter, the offline charging parameter includes at least one of a time limit parameter, an uplink/downlink volume limit parameter, and a rate change time parameter.

Further, a value of the time limit parameter is the time limit or a time limit threshold, a value of the uplink/downlink volume limit parameter is the uplink/downlink volume limit or a volume limit threshold, and a value of the rate change time parameter is the rate change time or a rate change time threshold.

Optionally, in the first aspect and the third aspect, the charging measurement parameter further includes at least one of a report threshold parameter, a valid time parameter, an idle time parameter, a report indication parameter, and an update indication parameter.

Further, a value of the report threshold parameter is 0, a value of the valid time parameter is a valid time threshold, a value of the idle time parameter is an idle time threshold, and values of the report indication parameter and the update indication parameter are preset valid values.

In this embodiment of the present disclosure, when the charging system is an offline charging system, the traffic flow charging parameter is the offline charging parameter, and the corresponding charging measurement parameter may be determined by using the offline charging parameter. For example, the offline charging parameter is mapped to a preset charging measurement parameter to obtain a charging measurement parameter resulting from the mapping, that is, the charging measurement parameter determined based on the traffic flow charging parameter.

Optionally, in the first aspect and the third aspect, when the traffic flow charging parameter is the online charging parameter, the charging system is an online charging system, and the third message is a quota request message.

Optionally, in the first aspect and the third aspect, when the traffic flow charging parameter is the online charging parameter, the charging measurement parameter includes at least one of a time limit parameter, an uplink/downlink volume limit parameter, a rate change time parameter, a report threshold parameter, a valid time parameter, and an idle time parameter.

Correspondingly, when the traffic flow charging parameter is the online charging parameter, the online charging parameter includes at least one of a time quota, an uplink/downlink volume quota, a rate change time, a quota threshold, a quota validity time, and a quota holding time.

Further, a value of the time limit parameter is the time quota or a time limit threshold, a value of the uplink/downlink volume limit parameter is the uplink/downlink volume quota or a volume limit threshold, a value of the rate change time parameter is the rate change time or a rate change time threshold, a value of the report threshold parameter is the quota threshold or a report threshold, a value of the valid time parameter is the quota validity time or a valid time threshold, and a value of the idle time parameter is the quota holding time or an idle time threshold.

Optionally, in the first aspect and the third aspect, the charging measurement parameter further includes at least one of a report indication parameter and an update indication parameter.

Further, a value of the report indication parameter is a preset valid value, and a value of the update indication parameter is a preset invalid value.

Optionally, in the first aspect and the third aspect, when the traffic flow charging parameter is the online charging parameter, the charging measurement parameter includes at least one of an uplink/downlink volume limit parameter, a rate change time parameter, a report threshold parameter, a valid time parameter, and an idle time parameter, as well as a time limit parameter.

Correspondingly, when the traffic flow charging parameter is the online charging parameter, the online charging parameters include at least one of an uplink/downlink volume quota, a rate change time, a quota threshold, a quota validity time, and a quota holding time, as well as a quota consumption time attribute-value pair.

Further, a value of the uplink/downlink volume limit parameter is the uplink/downlink volume quota or a volume limit threshold, a value of the rate change time parameter is the rate change time or a rate change time threshold, a value of the report threshold parameter is the quota threshold or 0, a value of the valid time parameter is the quota validity time or a valid time threshold, a value of the idle time parameter value is the quota holding time or a idle time threshold, and a value of the time limit parameter is the quota consumption time attribute-value pair.

Optionally, in the first aspect and the third aspect, the charging measurement parameter further includes at least one of a report indication parameter and an update indication parameter.

Further, a value of the report indication parameter is a preset invalid value, and a value of the update indication parameter is a preset valid value.

In this embodiment of the present disclosure, when the charging system is the online charging system, the traffic flow charging parameter is the online charging parameter, and the corresponding charging measurement parameter may be determined by using the online charging parameter. For example, the online charging parameter is mapped to a preset charging measurement parameter to obtain a charging measurement parameter resulting from the mapping, that is, the charging measurement parameter determined based on the traffic flow charging parameter.

It can be learned that, in this embodiment of the present disclosure, the control plane network element may determine, according to the foregoing implementations, charging measurement parameters of a same type based on the offline charging parameter and the online charging parameter. To be specific, the charging measurement parameter determined based on the offline charging parameter and the charging measurement parameter determined based on the online charging parameter are charging measurement parameters in one charging measurement parameter set. Therefore, the control plane network element sends the charging measurement parameter set including the determined charging measurement parameter to the forwarding plane network element for charging measurement. In this way, an offline charging function and an online charging function can be unified at the forwarding plane network element, and complexity of implementation of the forwarding plane network element and a control interface between the forwarding plane network element and the apparatus can be reduced.

Optionally, in the first aspect to the fourth aspect, the first cause value parameter is reaching time limit threshold residue, reaching volume limit threshold residue, reaching rate change time threshold, or indication information, where the indication information is used to instruct the forwarding plane network element to send the second message/the message in the second aspect.

Optionally, in the first aspect and the third aspect, when the first cause value parameter is reaching time limit threshold residue, the second cause value parameter is also the reaching time limit threshold residue. When the first cause value parameter is reaching volume limit threshold residue, the second cause value parameter is also the reaching volume limit threshold residue. When the first cause value parameter is reaching rate change time threshold, the second cause value parameter is also the reaching rate change time threshold. When the first cause value parameter is the indication information, the second cause value parameter is a quality of service change, a radio access technology change, a configuration change, request re-authorization by a diameter trust control application, or service termination.

According to this embodiment of the present disclosure, when a condition indicated by the second cause value parameter is satisfied, the control plane network element sends the third message to the charging system, so that the control plane network element sends the third message only when sending the third message is required. In this way, working efficiency of the control plane network element can be improved, and resources of the control plane network element can be saved.

Optionally, in the first aspect to the fourth aspect, the first charging measurement result parameter may include at least one of a lasting time of the traffic flow measured by the forwarding plane network element and a traffic volume consumed by the traffic flow.

Optionally, in the first aspect and the third aspect, the second charging measurement result parameter may include at least one of a lasting time of the traffic flow measured by the forwarding plane network element and a traffic volume consumed by the traffic flow. The traffic volume consumed by the traffic flow may include at least one of an uplink traffic volume consumed by the traffic flow and a downlink traffic volume consumed by the traffic flow.

According to a fifth aspect, an embodiment of the present disclosure provides a control plane network element, including at least one processor, an interface circuit, a memory, and a system bus, where the memory is configured to store a computer executable instruction; the at least one processor, the interface circuit, and the memory are interconnected by using the system bus; and when the control plane network element runs, the at least one processor executes the computer executable instruction stored in the memory, so that the control plane network element performs the charging measurement method according to any one of the first aspect and the optional implementations of the first aspect.

According to a sixth aspect, an embodiment of the present disclosure provides a computer readable storage medium. The computer readable storage medium stores one or more programs. The one or more programs include an instruction, and when the instruction is executed by at least one processor of a control plane network element, the control plane network element performs the charging measurement method according to any one of the first aspect and the optional implementations of the first aspect.

According to a seventh aspect, an embodiment of the present disclosure provides a system chip, including at least one processor, an interface circuit, a memory, and a system bus, where the memory is configured to store a computer executable instruction; the at least one processor, the interface circuit, and the memory are interconnected by using the system bus; and when the system chip runs, the at least one processor executes the computer executable instruction stored in the memory, so that the system chip executes the charging measurement method according to any one of the first aspect and the optional implementations of the first aspect.

According to an eighth aspect, an embodiment of the present disclosure provides a forwarding plane network element, including at least one processor, an interface circuit, a memory, and a system bus, where the memory is configured to store a computer executable instruction; the at least one processor, the interface circuit, and the memory are interconnected by using the system bus; and when the forwarding plane network element runs, the at least one processor executes the computer executable instruction stored in the memory, so that the forwarding plane network element performs the charging measurement method according to any one of the second aspect and the optional implementations of the second aspect.

According to a ninth aspect, an embodiment of the present disclosure provides a computer readable storage medium. The computer readable storage medium stores one or more programs. The one or more programs include an instruction, and when the instruction is executed by at least one processor of a forwarding plane network element, the forwarding plane network element performs the charging measurement method according to any one of the second aspect and the optional implementations of the second aspect.

According to a tenth aspect, an embodiment of the present disclosure provides a system chip, including at least one processor, an interface circuit, a memory, and a system bus, where the memory is configured to store a computer executable instruction; the at least one processor, the interface circuit, and the memory are interconnected by using the system bus; and when the system chip runs, the at least one processor executes the computer executable instruction stored in the memory, so that the system chip executes the charging measurement method according to any one of the second aspect and the optional implementations of the second aspect.

According to an eleventh aspect, an embodiment of the present disclosure provides a charging measurement system, including the control plane network element according to any one of the third aspect and the optional implementations of the third aspect, or according to the fifth aspect, and the forwarding plane network element according to any one of the fourth aspect and the optional implementations of the fourth aspect, or according to the eighth aspect.

According to the charging measurement system provided in this embodiment of the present disclosure, regardless of an online charging mode or an offline charging mode, the control plane network element may determine the corresponding charging measurement parameter based on the obtained traffic flow charging parameter (that is, the online charging parameter or the offline charging parameter). In addition, the charging measurement parameter determined based on the online charging parameter and the charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, an offline charging function (a charging function corresponding to the offline charging mode) and an online charging function (a charging function corresponding to the online charging mode) can be unified in the forwarding plane network element, so that complexity of implementation of the forwarding plane network element and a control interface between the forwarding plane network element and the apparatus can be reduced.

BRIEF DESCRIPTION OF DRAWINGS

To describe the technical solutions in the embodiments of the present disclosure or more clearly, the following briefly describes the accompanying drawings required for describing the embodiments or the prior art. Apparently, the accompanying drawings in the following description show merely some embodiments of the present disclosure.

DESCRIPTION OF EMBODIMENTS

The character "/" in this specification generally indicates an "or" relationship between the associated objects. For example, A/B can be understood as A or B.

In the specification and the claims of the present disclosure, the terms "first", "second", "third", and the like are intended to distinguish between different objects but do not indicate a particular order of the objects. For example, a first message, a second message, a third message, and the like are intended to distinguish between different messages, but not describe a characteristic order of the messages.

In addition, the terms "including/comprising", "having", or any other variant thereof mentioned in the descriptions of the present disclosure, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

In the following description, specific details such as a particular system structure, an interface, and a technology are set forth in an illustrative but not a restrictive sense to make a thorough understanding of the present disclosure. However, a person skilled in the art should know that the present disclosure may be practiced in other embodiments without these specific details. In other circumstances, detailed descriptions of well-known apparatuses, circuits, and methods are omitted, so that the present disclosure is described without being obscured by unnecessary details.

In addition, in the embodiments of the present disclosure, the word "exemplary" or "for example" is used to represent giving an example, an illustration, or a description. Any embodiment or design scheme described as an "exemplary" or "for example" in this application should not be interpreted as being more preferred or more advantageous than any other embodiment or design scheme. Exactly, use of the word "exemplary" or "example" or the like is intended to present a concept in a specific manner. In addition, "relevant" and "corresponding" may sometimes be used interchangeably. It should be noted that they express a same meaning unless their differences are emphasized.

The "report" mentioned in the following embodiments of the present disclosure can be understood as "send". For example, that A reports a message to B can be understood as that A sends a message to B, that A sends B a message, or the like.

The following describes in detail the technical solutions in the embodiments of the present disclosure with reference to the accompanying drawings in the embodiments of the present disclosure. Apparently, the described embodiments are merely some but not all of the embodiments of the present disclosure.

Figure 1:
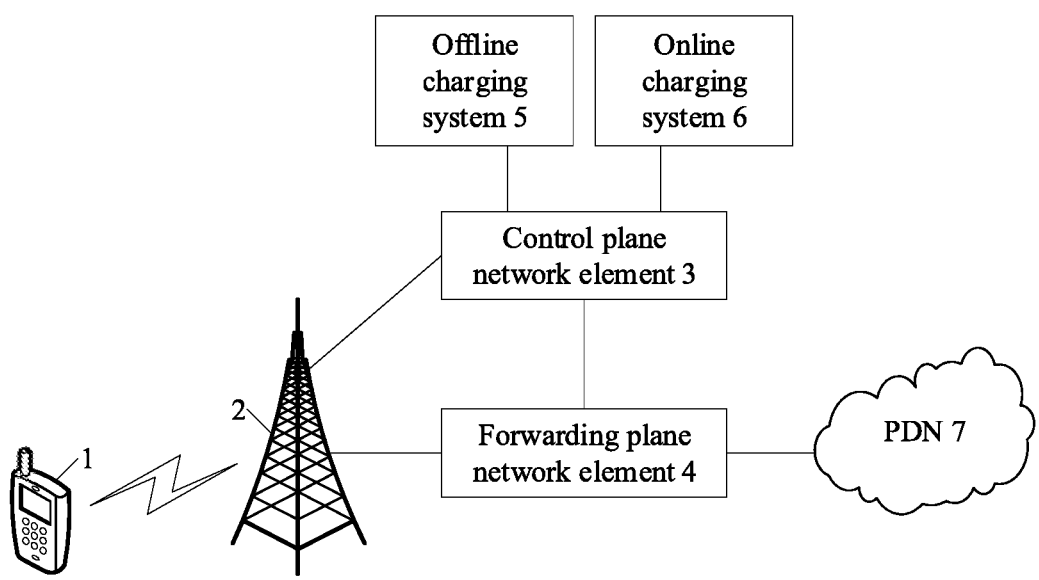
FIG. 1 is a schematic diagram of an architecture of a charging measurement system according to an embodiment of the present disclosure.

The embodiments of the present disclosure provide a charging measurement method, apparatus, and system. The charging measurement method and apparatus may be applied to the charging measurement system. As shown in FIG. 1, FIG. 1 is a schematic diagram of an architecture of a charging measurement system according to an embodiment of the present disclosure. In FIG. 1, a terminal 1 and a base station 2 stay connected wirelessly; the base station 2 is connected to a control plane network element 3 and a forwarding plane network element 4; the control plane network element 3 is connected to the forwarding plane network element 4, an offline charging system 5, and an online charging system 6; and the forwarding plane network element 4 is connected to a packet data network (PDN) 7. To help better understand the charging measurement system provided in this embodiment of the present disclosure, the following briefly introduces the devices in the charging measurement system separately.

The terminal refers to a network terminal device, including but not limited to, a mobile terminal (such as a mobile phone), a network access terminal device, and a terminal device of the Internet of Things.

The base station refers to a device that provides a terminal with radio access, including but not limited to, an evolved NodeB (eNodeB), a wireless access point (WiFi AP), a base station using a $5^{th}$ generation mobile communications technology (5G BS), a Worldwide Interoperability for Microwave Access base station (WiMAX BS), and the like.

The control plane network element is a network element having a mobility management function, a session management function, a forwarding path management function, or a charging policy management function in a network, for example, a mobility management entity (MME), a control plane network gateway (UGW-C), a policy and charging rules function (PCRF) unit, or all or some functional units of a mobile gateway controller that is formed by integrating the foregoing network elements into a software-defined network (SDN) controller. When control and forwarding of a charging function are separated, the control plane network element is mainly responsible for delivering a charging measurement parameter to the forwarding plane network element, receiving a charging measurement result parameter sent by the forwarding plane network element, parsing control signaling, recording charging status information, matching a charging measurement result parameter reported by the forwarding plane network element, generating a charging data record, consolidating charging data records, performing charging control, and the like. The control plane network element may include a CTF control unit (CTF-C), a charging data function (CDF), or a combination of both.

The forwarding plane network element refers to a network element performing a data forwarding action, and may be a physical forwarding device or a virtual forwarding device in a network, such as a P-GW, a S-GW, a P-GW/S-GW forwarding plane (which may be referred to as a forwarding plane gateway such as a UGW-U), a router, a switch, or an SDN switch. When control and forwarding of the charging function are separated, the forwarding plane network element mainly measures use of network resources by a traffic flow, for example, measurement based on time-based measurement, volume, or service-specific unit (SSU). The forwarding plane network element may include a CTF subscriber unit (CTF-U).

Further, the control plane network element may be a control plane network element, or may be a control plane network element entity composed of a group of control plane network elements. The control plane network element may be a physical control device or a virtual control device. No specific limitation is imposed in the present disclosure.

Based on the charging measurement system shown in FIG. 1, in a charging measurement method provided in this embodiment of the present disclosure, regardless of an online charging mode or an offline charging mode, the control plane network element may obtain a traffic flow charging parameter, and determine a charging measurement parameter based on the traffic flow charging parameter. Then, the control plane network element sends a charging measurement parameter set including the determined charging measurement parameter to the forwarding plane network element. The forwarding plane network element performs, based on the charging measurement parameter set, charging measurement on a traffic flow transmitted by the terminal. According to the charging measurement method provided in this embodiment of the present disclosure, regardless of an online charging mode or an offline charging mode, the control plane network element may determine the corresponding charging measurement parameter based on the obtained traffic flow charging parameter (that is, an online charging parameter or an offline charging parameter). In addition, a charging measurement parameter determined based on the online charging parameter and a charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, an offline charging function (a charging function corresponding to the offline charging mode) and an online charging function (a charging function corresponding to the online charging mode) can be unified in the forwarding plane network element, so that complexity of implementation of the forwarding plane network element and a control interface between the forwarding plane network element and the control plane network element can be reduced.

Figure 2:
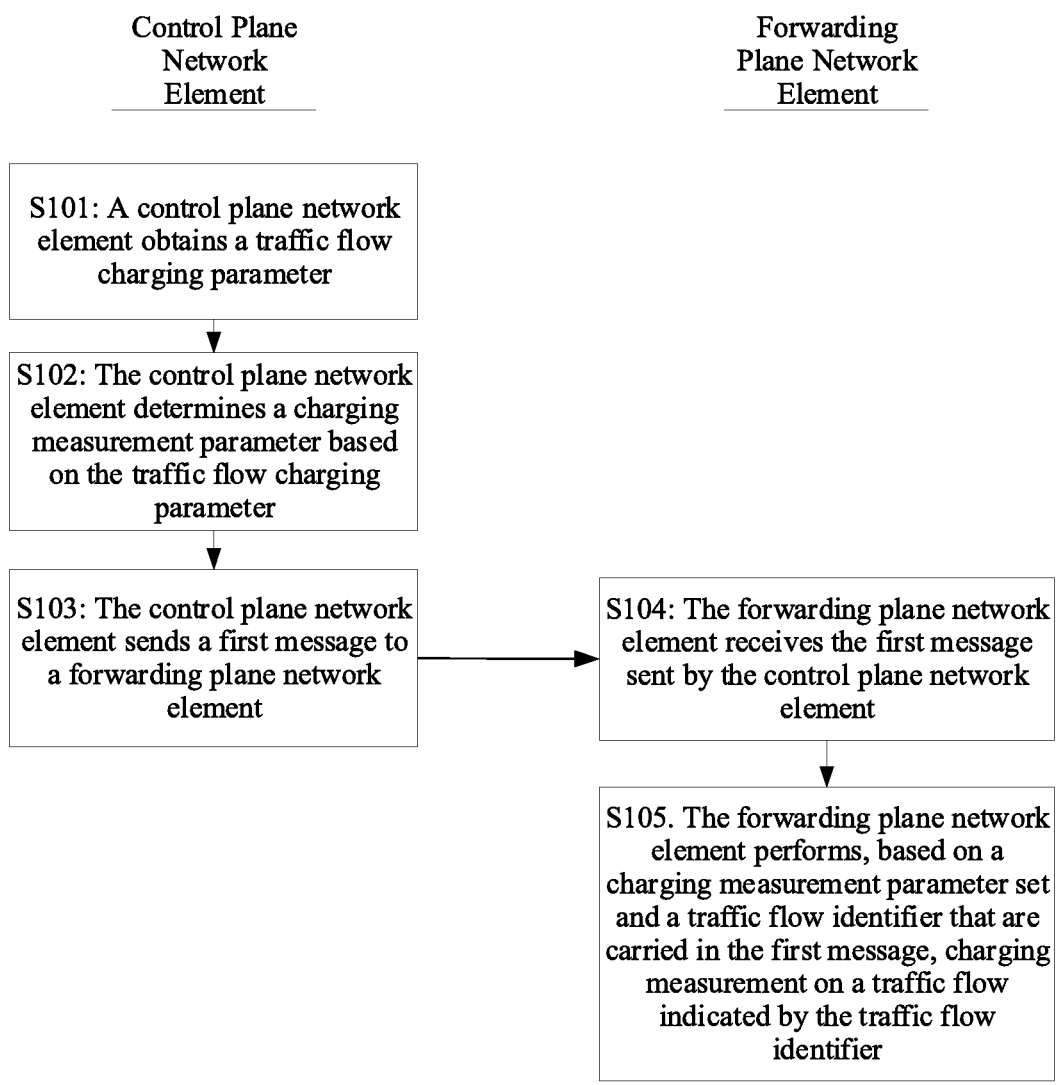
FIG. 2 is schematic diagram 1 of a charging measurement method according to an embodiment of the present disclosure.

Based on the charging measurement system shown in FIG. 1, as shown in FIG. 2, an embodiment of the present disclosure provides a charging measurement method. The method may include the following steps.

S101: A control plane network element obtains a traffic flow charging parameter.

The traffic flow charging parameter in this embodiment of the present disclosure may be an online charging parameter or an offline charging parameter. When a charging mode is an online charging mode, the traffic flow charging parameter is the online charging parameter. When the charging mode is an offline charging mode, the traffic flow charging parameter is the offline charging parameter.

S102: The control plane network element determines a charging measurement parameter based on the traffic flow charging parameter.

A charging measurement parameter determined based on the online charging parameter and a charging measurement parameter determined based on the offline charging parameter are charging measurement parameters in one charging measurement parameter set.

In this embodiment of the present disclosure, a charging measurement parameter set may be preset in the control plane network element. The charging measurement parameter set includes at least one charging measurement parameter, and each charging measurement parameter may also be referred to as one charging measurement parameter.

For one implementation of the foregoing S102, the control plane network element may map the obtained traffic flow charging parameter to a corresponding charging measurement parameter in the preset charging measurement parameter set to obtain the foregoing charging measurement parameter.

In this embodiment of the present disclosure, for convenience of description and for distinguishing between the preset charging measurement parameter set and the charging measurement parameter determined based on the traffic flow charging parameter, a charging measurement parameter in the preset charging measurement parameter set may be referred to as a first charging measurement parameter (that is, a charging measurement parameter existing before mapping or without being assigned with a value), and a charging measurement parameter determined based on the traffic flow charging parameter (that is, a charging measurement parameter existing after mapping or with a value assigned) is referred to as a second charging measurement parameter. In other words, the preset charging measurement parameter set includes at least one first charging measurement parameter, and the charging measurement parameter includes at least one second charging measurement parameter. Parameter name of a first charging measurement parameter and a corresponding second charging measurement parameter is the same.

After the control plane network element obtains the traffic flow charging parameter, regardless of whether the traffic flow charging parameter is the online charging parameter or the offline charging parameter, the control plane network element may map the traffic flow charging parameter to a corresponding first charging measurement parameter in the charging measurement parameter set, to obtain a corresponding second charging measurement parameter, and the second charging measurement parameter is the charging measurement parameter determined based on the traffic flow charging parameter. The control plane network element may map the online charging parameter and the offline charging parameter to corresponding first charging measurement parameters in the charging measurement parameter set, and therefore both the charging measurement parameter obtained after the control plane network element maps the online charging parameter and the charging measurement parameter obtained after the control plane network element maps the offline charging parameter are charging measurement parameters in the charging measurement parameter set. In other words, both the charging measurement parameter (including at least one second charging measurement parameter) obtained after the control plane network element maps the online charging parameter and the charging measurement parameter (including at least one second charging measurement parameter) obtained after the control plane network element maps the offline charging parameter are corresponding to one or some first charging measurement parameters in the charging measurement parameter set.

Specifically, after the control plane network element obtains the online charging parameter, the control plane network element may map the online charging parameter to a corresponding first charging measurement parameter in the preset charging measurement parameter set. After the control plane network element obtains the offline charging parameter, the control plane network element may still map the offline charging parameter to a corresponding first charging measurement parameter in the charging measurement parameter set. In this way, it can be ensured that the control plane network element may map the online charging parameter and the offline charging parameter to first charging measurement parameters of a same type to obtain second charging measurement parameters of a same type. In other words, the charging measurement parameter determined by the control plane network element based on the online charging parameter and the charging measurement parameter determined by the control plane network element based on the offline charging parameter are charging measurement parameters in one charging measurement parameter set. In this way, the control plane network element sends, to a forwarding plane network element, the charging measurement parameter set including the charging measurement parameter determined by the control plane network element for charging measurement, and the forwarding plane network element may perform charging measurement directly without telling whether an offline charging mode or an online charging mode is used. In other words, the forwarding plane network element may perform charging measurement directly based on the received charging measurement parameter set (the charging measurement parameter in the charging measurement parameter set corresponding to the offline charging mode and the charging measurement parameter in the charging measurement parameter set corresponding to the online charging mode are of a same type). In this way, it can be ensured that an offline charging function and an online charging function are unified at the forwarding plane network element, so that complexity of implementation of the forwarding plane network element and a control interface between the forwarding plane network element and the control plane network element can be reduced.

A specific method of mapping from the online charging parameter to the corresponding first charging measurement parameter in the charging measurement parameter set and a specific method of mapping from the offline charging parameter to the corresponding first charging measurement parameter in the charging measurement parameter set are described in detail in the following embodiments.

Optionally, in this embodiment of the present disclosure, when determining the charging measurement parameter based on the traffic flow charging parameter, the control plane network element may alternatively refer to subscription data and location information that are of a terminal.

For example, if the control plane network element learns, based on the subscription data of the terminal, that the terminal is a gold subscriber, the control plane network element may map a traffic flow charging parameter preset for gold subscribers to a corresponding first charging measurement parameter in the charging measurement parameter set, to obtain a corresponding second charging measurement parameter. For a traffic flow charging parameter that is not preset for gold subscribers, a corresponding second charging measurement parameter may be determined based on the traffic flow charging parameter obtained by the control plane network element.

If the control plane network element learns, based on the location information of the terminal, that the terminal is at a location A, the control plane network element may map a traffic flow charging parameter preset for terminals at the location A to a corresponding first charging measurement parameter in the charging measurement parameter set, to obtain a corresponding second charging measurement parameter. For a traffic flow charging parameter that is not preset for terminals at the location A, a corresponding second charging measurement parameter may be determined based on the obtained traffic flow charging parameter.

S103: The control plane network element sends a first message to a forwarding plane network element.

The first message carries a charging measurement parameter set and a traffic flow identifier, and the first message is used to trigger the forwarding plane network element to perform, based on the charging measurement parameter set, charging measurement on a traffic flow indicated by the traffic flow identifier. The traffic flow identifier may be used to indicate a specific traffic flow.

It should be noted that, in this embodiment of the present disclosure, the charging measurement parameter determined in S102 by the control plane network element based on the online charging parameter and the charging measurement parameter determined in S102 by the control plane network element based on the offline charging parameter are charging measurement parameters in one charging measurement parameter set, and therefore in S103, the charging measurement parameter set sent by the control plane network element to the forwarding plane network element includes the charging measurement parameter determined in S102.

In this embodiment of the present disclosure, the traffic flow refers to a group of packets (or service packets) based on a packet header field property, for example, packets having a same source Internet protocol (IP) address and a same destination IP address, packets having a same IP quintuplet, or packets conforming to a specific header field rule.

The foregoing traffic flow identifier is an identifier of a packet header field property of the traffic flow, for example, a source IP address, a destination IP address, an IP quintuplet, or a specific header field identifier, of a packet.

S104: The forwarding plane network element receives the first message sent by the control plane network element.

S105. The forwarding plane network element performs, based on a charging measurement parameter set and a traffic flow identifier that are carried in the first message, charging measurement on a traffic flow indicated by the traffic flow identifier.

The traffic flow indicated by the traffic flow identifier may be an uplink traffic flow of the terminal or a downlink traffic flow of the terminal. The uplink traffic flow of the terminal is a traffic flow transmitted by the terminal to a base station; and the downlink traffic flow of the terminal is a traffic flow transmitted by a base station to the terminal.

Specifically, the forwarding plane network element may identify, based on the traffic flow identifier carried in the first message, a traffic flow forwarded by the forwarding plane network element. After the forwarding plane network element identifies the traffic flow indicated by the traffic flow identifier, the forwarding plane network element may perform, based on the charging measurement parameter set carried in the first message, charging measurement on the traffic flow. A specific process for performing charging measurement on the traffic flow by the forwarding plane network element is similar to a specific process in the prior art in which a forwarding plane network element performs charging measurement on a traffic flow. For details, refer to the specific process in the prior art in which a forwarding plane network element performs charging measurement on a traffic flow, and the details are not further described in this embodiment of the present disclosure.

According to the charging measurement method provided in this embodiment of the present disclosure, regardless of an online charging mode or an offline charging mode, the control plane network element may determine the corresponding charging measurement parameter based on the obtained traffic flow charging parameter (that is, the online charging parameter or the offline charging parameter). In addition, the charging measurement parameter determined based on the online charging parameter and the charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, the forwarding plane network element may perform charging measurement directly without telling whether an offline charging mode or an online charging mode is used. In other words, the forwarding plane network element may perform charging measurement directly based on the received charging measurement parameter set (the charging measurement parameter in the charging measurement parameter set corresponding to the offline charging mode and the charging measurement parameter in the charging measurement parameter set corresponding to the online charging mode are of a same type). In this way, it can be ensured that an offline charging function and an online charging function are unified at the forwarding plane network element, so that complexity of implementation of the forwarding plane network element and a control interface between the forwarding plane network element and the control plane network element can be reduced.

Figure 3:
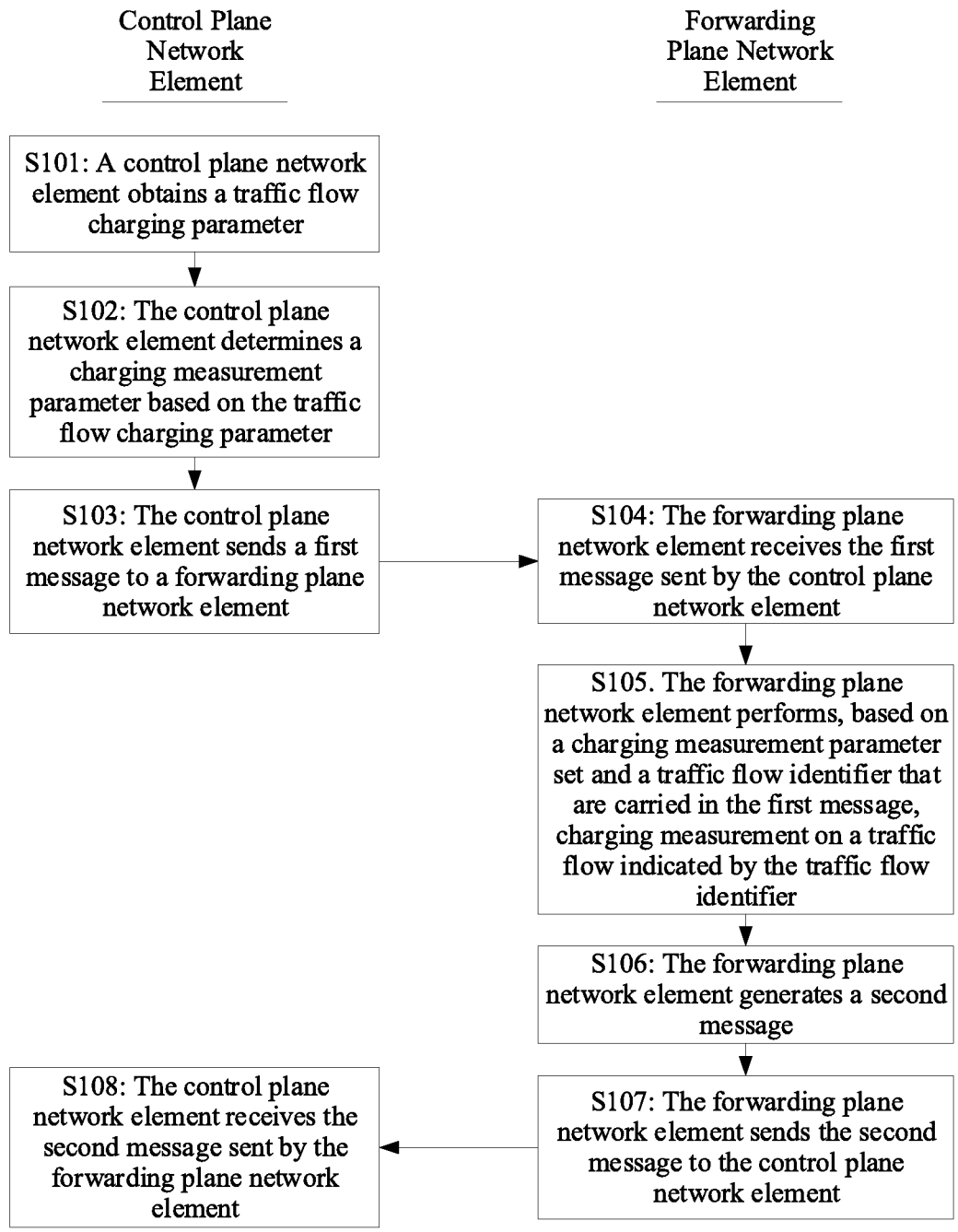
FIG. 3 is schematic diagram 2 of a charging measurement method according to an embodiment of the present disclosure.

Optionally, with reference to FIG. 2, as shown in FIG. 3, after S105, the charging measurement method provided in this embodiment of the present disclosure may further include the following steps.

S106: The forwarding plane network element generates a second message.

The second message carries a first charging measurement result parameter obtained after charging measurement is performed by the forwarding plane network element on the traffic flow and a first cause value parameter indicating a cause that has triggered the forwarding plane network element to send the second message.

Optionally, the first charging measurement result parameter may include at least one of a lasting time of the traffic flow measured by the forwarding plane network element and a traffic volume consumed by the traffic flow. The traffic volume consumed by the traffic flow may include at least one of an uplink traffic volume consumed by the traffic flow and a downlink traffic volume consumed by the traffic flow.

Optionally, the first cause value parameter may be reaching volume limit threshold residue, reaching volume limit threshold residue, reaching rate change time threshold, or indication information. The indication information is used to instruct the forwarding plane network element to send the second message.

In a possible implementation, in S106, the forwarding plane network element may specifically generate the second message based on a value of a report indication parameter in the charging measurement parameter sent by the control plane network element. Specifically, when the value of the report indication parameter is a valid value, the forwarding plane network element generates the second message; when the value of the report indication parameter is an invalid value, the forwarding plane network element does not need to generate the second message. Description of the report indication parameter and the value thereof is to be explained in detail in a description of the charging measurement parameter in the following embodiment, and details are not described for now.

S107: The forwarding plane network element sends the second message to the control plane network element.

S108: The control plane network element receives the second message sent by the forwarding plane network element.

The second message is used by the forwarding plane network element to send, to the control plane network element, a charging measurement result parameter, that is, the first charging measurement result parameter, obtained after the forwarding plane network element performs charging measurement on the traffic flow. Therefore, the second message may also be referred to as a charging measurement result report message.

In this embodiment of the present disclosure, after the forwarding plane network element performs, based on the charging measurement parameter sent by the control plane network element, charging measurement on the traffic flow forwarded by the forwarding plane network element, the forwarding plane network element may generate the second message based on the report indication parameter in the charging measurement parameter, and sends the second message to the control plane network element. The second message carries the first charging measurement result parameter obtained after the forwarding plane network element performs charging measurement on the traffic flow, so that the control plane network element may convert the first charging measurement result parameter and send a conversion result to a corresponding charging system (an online charging system or an offline charging system). Then the charging system may perform charging based on the corresponding charging measurement result parameter.

Figure 4:
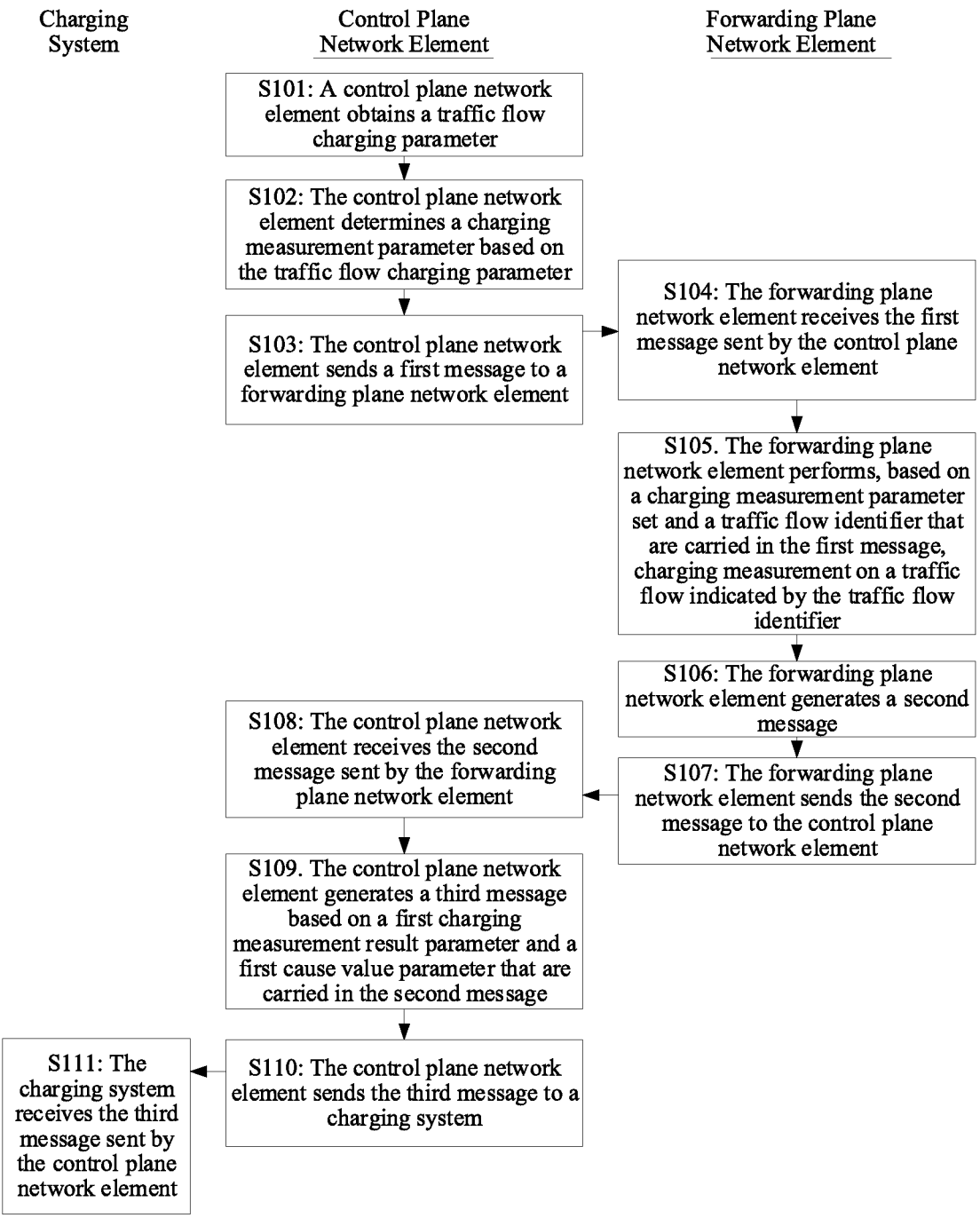
FIG. 4 is schematic diagram 3 of a charging measurement method according to an embodiment of the present disclosure.

Optionally, with reference to FIG. 3, as shown in FIG. 4, after S108, the charging measurement method provided in this embodiment of the present disclosure may further include the following steps.

S109. The control plane network element generates a third message based on a first charging measurement result parameter and a first cause value parameter that are carried in the second message.

The third message carries a second charging measurement result parameter, a control plane charging parameter, and a second cause value parameter.

Optionally, in the charging measurement method provided in this embodiment of the present disclosure, the first cause value parameter and the second cause value parameter may be the same or may be different, and a specific first cause value parameter and a specific second cause value may be any of the following combinations:

(1) When the first cause value parameter is reaching time limit threshold residue, the second cause value parameter is also the reaching time limit threshold residue.

(2) When the first cause value parameter is reaching volume limit threshold residue, the second cause value parameter is also the reaching volume limit threshold residue.

(3) When the first cause value parameter is reaching rate change time threshold, the second cause value parameter is also the reaching rate change time threshold.

(4) When the first cause value parameter is the indication information, the second cause value parameter is a quality of service change, a radio access technology change, a configuration change, request re-authorization by a diameter trust control application, or service termination.

Specifically, in the foregoing (4), before the control plane network element receives the second message (that is, the charging measurement result report message) sent by the forwarding plane network element, the control plane network element may first send a charging measurement result report request message to the forwarding plane network element. The charging measurement result report request message is used to request the forwarding plane network element to report, to the control plane network element, the charging measurement result parameter, that is, the first charging measurement result parameter, obtained after the forwarding plane network element performs charging measurement on the traffic flow.

A trigger condition for the control plane network element to send the charging measurement result report request message to the forwarding plane network element is corresponding to the second cause value parameter in the foregoing (4). In other words, in a case of a quality of service change, a radio access technology change, a configuration change, request re-authorization by a diameter trust control application, or service termination, the control plane network element may request the forwarding plane network element to report the charging measurement result parameter, that is, the first charging measurement result parameter, obtained after the forwarding plane network element performs charging measurement on the traffic flow.

Optionally, the second charging measurement result parameter may include at least one of a lasting time of the traffic flow measured by the forwarding plane network element and a traffic volume consumed by the traffic flow. The traffic volume consumed by the traffic flow may include at least one of an uplink traffic volume consumed by the traffic flow and a downlink traffic volume consumed by the traffic flow.

In this embodiment of the present disclosure, the first charging measurement result parameter and the second charging measurement result parameter may be the same or may be different. For example, if the first charging measurement result parameter is the lasting time of the traffic flow measured by the forwarding plane network element, the second charging measurement result parameter is also the lasting time of the traffic flow; if the first charging measurement result parameter is the traffic volume consumed by the traffic flow measured by the forwarding plane network element, the second charging measurement result parameter is also the traffic volume consumed by the traffic flow; if the first charging measurement result parameter is the lasting time of the traffic flow measured by the forwarding plane network element and the traffic volume consumed by the traffic flow, the second charging measurement result parameter is at least one of the lasting time of the traffic flow and the traffic volume consumed by the traffic flow.

Optionally, the control plane charging parameter may be obtained by the control plane network element based on a subscriber's context. The control plane charging parameter may include at least one of quality of service (QoS) associated with the traffic flow, a traffic flow identifier, an IP address of the forwarding plane network element, and an international mobile subscriber identification number (IMSI) of the forwarding plane network element.

S110: The control plane network element sends the third message to a charging system.

S111: The charging system receives the third message sent by the control plane network element.

After the charging system receives the third message sent by the control plane network element, the charging system may perform charging on the traffic flow based on the second charging measurement result parameter, the control plane charging parameter, and the second cause value parameter that are carried in the third message.

Specifically, when the charging system is an offline charging system, the offline charging system may generate, based on the second charging measurement result parameter, the control plane charging parameter, and the second cause value parameter that are carried in the third message, a charging data record corresponding to the traffic flow. When the charging system is an online charging system, the online charging system may perform online charging quota management on the traffic flow based on the second charging measurement result parameter, the control plane charging parameter, and the second cause value parameter that are carried in the third message.

Optionally, in this embodiment of the present disclosure, the charging system includes an offline charging system or an online charging system. When the charging mode is an online charging mode, the traffic flow charging parameter is an online charging parameter, the charging system is the online charging system, and the third message is a quota request message. In this case, the third message further carries a quota request parameter. When the charging mode is an offline charging mode, the traffic flow charging parameter is the offline charging parameter, the charging system is the offline charging system, and the third message is a charging data record request message.

When the charging mode is the online charging mode, the online charging mode may include an online charging quota management mode or an online charging envelope generation mode.

To more clearly explain the technical solutions and corresponding implementations of the present disclosure, the following uses the offline charging mode, the online charging quota management mode, and the online charging envelope generation mode as an example to illustrate the traffic flow charging parameter, the charging measurement parameter, the charging measurement parameter set, and the charging measurement parameter determined based on the traffic flow charging parameter that are in this embodiment of the present disclosure.

(I) Offline charging mode

In the charging measurement method provided in this embodiment of the present disclosure, when the charging mode is the offline charging mode, the foregoing charging measurement parameter (the charging measurement parameter determined based on the offline charging parameter) includes at least one of a time limit parameter, an uplink/downlink volume limit parameter, and a rate change time parameter.

Correspondingly, the offline charging parameter may include at least one of a time limit parameter, an uplink/downlink volume limit parameter, and a rate change time parameter.

A value of the time limit parameter may be the time limit or a time limit threshold, a value of the uplink/downlink volume limit parameter may be the uplink/downlink volume limit or a volume limit threshold, and a value of the rate change time parameter may be the rate change time or a rate change time threshold.

The time limit threshold, the volume limit threshold, and the rate change time threshold are all preset based on actual use requirements. For example, these thresholds may be preset in the control plane network element based on actual use requirements.

Each of the offline charging parameters may be referred to as an offline charging parameter; and each of the charging measurement parameters may be referred to as a second charging measurement parameter.

It should be noted that if the offline charging parameter obtained by the control plane network element includes an offline charging parameter or offline charging parameters corresponding to one or some preset first charging measurement parameters, the control plane network element may directly map the offline charging parameter to the first charging measurement parameter, that is, setting a value of the first charging measurement parameter to a value of the corresponding offline charging parameter, so as to obtain a corresponding second charging measurement parameter. If the offline charging parameter obtained by the control plane network element does not include an offline charging parameter or offline charging parameters corresponding to one or some preset first charging measurement parameters, the control plane network element may map a threshold specified for the first charging measurement parameter to the corresponding first charging measurement parameter, that is, setting a value of the first charging measurement parameter to the corresponding first charging measurement parameter, to obtain a corresponding second charging measurement parameter. In this way, the control plane network element may determine the charging measurement parameter based on the offline charging parameter obtained by the control plane network element. The control plane network element may also send the charging measurement parameter set including the charging measurement parameter determined by the control plane network element to the forwarding plane network element for charging measurement.

For example, if the offline charging parameter obtained by the control plane network element includes a time limit corresponding to a preset time limit parameter, the control plane network element may directly map the time limit to the time limit parameter, that is, setting a value of the time limit parameter to a value of the time limit. If the offline charging parameter obtained by the control plane network element does not include an offline charging parameter corresponding to a preset time limit parameter, the control plane network element may map, to the time limit parameter, a time limit threshold specified for the time limit parameter, that is, setting a value of the time limit parameter to the time limit threshold.

Optionally, the charging measurement parameter may further include at least one of a report threshold parameter, a valid time parameter, an idle time parameter, a report indication parameter, and an update indication parameter.

A value of the report threshold parameter is 0, a value of the valid time parameter is a valid time threshold, a value of the idle time parameter is an idle time threshold, and values of the report indication parameter and the update indication parameter are preset valid values.

The valid time threshold, the idle time threshold, and the preset valid values are all preset based on actual use requirements. For example, these thresholds and valid values may be preset in the control plane network element based on actual use requirements. The valid values may be set to 1 or true, meaning that 1 or true may be used to indicate that the report indication parameter and the update indication parameter are valid.

Certainly, the valid values may alternatively be set to any other value or identifier that can indicate that the report indication parameter and the update indication parameter are valid. This is not specifically limited in this embodiment of the present disclosure.

Further, that the report indication parameter is valid may be understood as that, when a result (for example, the value of the first charging measurement result parameter) obtained after the forwarding plane network element performs charging measurement on the traffic flow reaches a value indicated by the report threshold parameter, the forwarding plane network element needs to report, to the control plane network element, the first charging measurement result parameter obtained after the forwarding plane network element performs charging measurement on the traffic flow. That the update indication parameter is valid may be understood as that, after the forwarding plane network element performs charging measurement on the traffic flow, the forwarding plane network element needs to reset the value of the first charging measurement result parameter obtained after the forwarding plane network element performs charging measurement on the traffic flow, and continue to perform charging measurement on a next traffic flow.

It should be noted that the valid time parameter means for how long the charging measurement parameter set sent by the control plane network element to the forwarding plane network element is valid. For example, if the value of the valid time parameter is the valid time threshold, it indicates that the charging measurement parameter set is valid within the valid time threshold. The idle time parameter means for how long the charging measurement parameter set sent by the control plane network element to the forwarding plane network element is not valid if not used. For example, if the value of the idle time parameter is the idle time threshold, it indicates that the charging measurement parameter set is invalid if the charging measurement parameter set is not used within the idle time threshold.

A person skilled in the art can understand that, during one implementation of the charging measurement method provided in this embodiment of the present disclosure, if the offline charging parameter obtained by the control plane network element is designed to include a parameter, the preset charging measurement parameter set is designed to include at least a first charging measurement parameter corresponding to this parameter, and another first charging measurement parameter in the charging measurement parameter set may be used as an optional first charging measurement parameter to be preset.

For example, if the offline charging measurement parameter obtained by the control plane network element is designed to include the uplink/downlink volume limit, the preset charging measurement parameter set is designed to include at least the uplink/downlink volume limit parameter, and other first charging measurement parameters in the preset charging measurement parameter set, such as the time limit parameter, the rate change time parameter, the report threshold parameter, the valid time parameter, the idle time parameter, the report indication parameter, and the update indication parameter, may all be used as optional first charging measurement parameters to be preset.

Further, the optional first charging measurement parameter in the charging measurement parameter set may be determined based on a preset corresponding threshold. In other words, a value of the optional first charging measurement parameter is set to the corresponding threshold. For specifics, refer to the foregoing related descriptions and examples in this embodiment, and details are not described herein again.

For example, Table 1 shows a schematic mapping relationship between offline charging parameters or preset values and a preset charging measurement parameter set (including a plurality of first charging measurement parameters) according to this embodiment of the present disclosure.

TABLE 1

| Charging measurement parameter set | |
| --- | --- |
| First charging measurement parameter | Offline charging parameter or preset value |
| Time limit parameter | Time limit or time limit threshold |
| Uplink/downlink volume limit parameter | Uplink/downlink volume limit or volume limit threshold |
| Rate change time parameter | Rate change time or rate change time threshold |
| Report threshold parameter | 0 |
| Valid time parameter | Valid time threshold |
| Idle time parameter | Idle time threshold |
| Report indication parameter | Valid value |
| Update indication parameter | Valid value |

As shown in Table 1, the offline charging parameter obtained by the control plane network element includes at least one of the time limit, the uplink/downlink volume limit, and the rate change time, and therefore the first charging measurement parameter corresponding to the offline charging parameter in the charging measurement parameter set shown in Table 1 may be determined based on the offline charging parameter. When there is no offline charging parameter, in the offline charging parameter, corresponding to the first charging measurement parameter in the charging measurement parameter set, the corresponding first charging measurement parameter in the charging measurement parameter set may be determined based on the preset value shown in Table 1.

For example, in Table 1, the time limit, the uplink/downlink volume limit, and the rate change time are all offline charging parameters obtained by the control plane network element; and the time limit threshold, the volume limit threshold, the rate change time threshold, 0, the valid time threshold, the idle time threshold, and the valid value are all preset values.

Table 1 merely shows an example of the mapping relationship between the offline charging parameters or preset values and the preset charging measurement parameter set (including a plurality of first charging measurement parameters). A quantity of first charging measurement parameters included in the charging measurement parameter set and a quantity of offline charging parameters included in the offline charging parameters may be set based on actual use requirements. This is not specifically limited in the present disclosure. In addition, to avoid repetition, for detailed descriptions of the offline charging parameters and the charging measurement parameter set, refer to the foregoing related description of the offline charging parameters and the charging measurement parameter set in this embodiment.

It should be noted that Table 1 may also be understood as the charging measurement parameter set (including the charging measurement parameter determined by the control plane network element based on the traffic flow charging parameter) sent by the control plane network element to the forwarding plane network element. To be specific, the control plane network element maps the offline charging parameters obtained by the control plane network element to the corresponding first charging measurement parameters in the preset charging measurement parameter set, to obtain corresponding second charging measurement parameters (the second charging measurement parameter is a charging measurement parameter obtained after the first charging measurement parameter is assigned a value). These second charging measurement parameters are the charging measurement parameters determined by the control plane network element based on the offline charging parameters obtained by the control plane network element. Then, the control plane network element sends the charging measurement parameter set including these charging measurement parameters to the forwarding plane network element for charging measurement.

(II) Online charging quota management mode

In the charging measurement method provided in this embodiment of the present disclosure, when the online charging mode is the online charging quota management mode, the charging measurement parameter may include at least one of a time limit parameter, an uplink/downlink volume limit parameter, and a rate change time parameter, a report threshold parameter, a valid time parameter, and an idle time parameter.

Correspondingly, the online charging parameter may include at least one of a time quota, an uplink/downlink volume quota, a rate change time, a quota threshold, a quota validity time, and a quota holding time.

A value of the time limit parameter may be the time quota or a time limit threshold, a value of the uplink/downlink volume limit parameter may be the uplink/downlink volume quota or a volume limit threshold, a value of the rate change time parameter may be the rate change time or a rate change time threshold, a value of the report threshold parameter may be the quota threshold or a report threshold, a value of the valid time parameter may be the quota validity time or a valid time threshold, and a value of the idle time parameter may be the quota holding time or an idle time threshold.

The time limit threshold, the volume limit threshold, the rate change time threshold, the report threshold, the valid time threshold, and the idle time threshold are all preset based on actual use requirements. For example, these thresholds may be preset in the control plane network element based on actual use requirements.

Each of the online charging parameters may be referred to as an online charging parameter; and each of the charging measurement parameters may be referred to as a second charging measurement parameter.

It should be noted that, if the online charging parameter obtained by the control plane network element includes an online charging parameter or online charging parameters corresponding to one or some preset first charging measurement parameters, the control plane network element may directly map the online charging parameter to the first charging measurement parameter, that is, setting a value of the first charging measurement parameter to a value of the corresponding online charging parameter, so as to obtain a corresponding second charging measurement parameter. If the online charging parameter obtained by the control plane network element does not include an online charging parameter or online charging parameters corresponding to one or some preset first charging measurement parameters, the control plane network element may map a threshold specified for the first charging measurement parameter to the corresponding first charging measurement parameter, that is, setting a value of the first charging measurement parameter to the corresponding first charging measurement parameter, to obtain a corresponding second charging measurement parameter. In this way, the control plane network element may determine the charging measurement parameter based on the online charging parameter obtained by the control plane network element. The control plane network element may also send the charging measurement parameter set including the charging measurement parameter determined by the control plane network element to the forwarding plane network element for charging measurement.

For example, if the online charging parameter obtained by the control plane network element includes a quota threshold corresponding to a preset report threshold parameter, the control plane network element may directly map the quota threshold to the report threshold parameter, that is, setting a value of the report threshold parameter to a value of the quota threshold. If the online charging parameter obtained by the control plane network element does not include an online charging parameter corresponding to a preset report threshold parameter, the control plane network element may map a report threshold specified for the report threshold parameter to the report threshold parameter, that is, setting the report threshold parameter value to the report threshold.

It should be noted that, for detailed descriptions of the valid time parameter and the idle time parameter, refer to the related description of the valid time parameter and the idle time parameter in (I), and details are not described herein again.

Optionally, the charging measurement parameter may further include at least one of a report indication parameter and an update indication parameter.

A value of the report indication parameter is a preset valid value, and a value of the update indication parameter is a preset invalid value.

The preset valid value and the preset invalid value are preset based on actual use requirements. For example, the valid value and the invalid value may be preset in the control plane network element based on actual use requirements. The valid value may be set to 1 or true, meaning that 1 or true may be used to indicate that the report indication parameter is valid. The invalid value may be set to 0 or false (or non-true), meaning that, 0 or may be used to indicate that the update indication parameter is invalid.

Certainly, the valid value may alternatively be set to any other value or identifier that can indicate that the report indication parameter is valid, and the invalid value may alternatively be set to any other value or identifier that can indicate that the update indication parameter is invalid. This is not specifically limited in this embodiment of the present disclosure.

Further, for a detailed description about the validity of the report indication parameter, refer to the related description in (I) about the validity of the report indication parameter, and details are not described herein again. That the update indication parameter is invalid may be understood as that, after the forwarding plane network element performs charging measurement on the traffic flow, the forwarding plane network element needs to continue to perform charging measurement on a next traffic flow, and terminates forwarding of packets in the traffic flow when a value of a charging measurement result parameter (including a first charging measurement result parameter and a charging measurement result parameter obtained by performing charging measurement on the next traffic flow) reaches a corresponding threshold (for example, reaching a time limit or an uplink/downlink volume limit) (this is different from the offline charging mode, and the forwarding plane network element does not need to reset the first charging measurement result parameter after the forwarding plane network element performs charging measurement on the traffic flow).

A person skilled in the art can understand that, during one implementation of the charging measurement method provided in this embodiment of the present disclosure, if the online charging parameter obtained by the control plane network element is designed to include a parameter, the preset charging measurement parameter set is designed to include at least a first charging measurement parameter corresponding to this parameter, and another first charging measurement parameter in the charging measurement parameter set may be used as an optional first charging measurement parameter to be preset.

For example, if the online charging measurement parameter obtained by the control plane network element is designed to include the rate change time, the preset charging measurement parameter set is designed to include at least the rate change time parameter, and other first charging measurement parameters in the preset charging measurement parameter set, such as the time limit parameter, the uplink/downlink volume limit parameter, the report threshold parameter, the valid time parameter, the idle time parameter, the report indication parameter, and the update indication parameter, may all be used as optional first charging measurement parameters to be preset.

Further, the optional first charging measurement parameter in the charging measurement parameter set may be determined based on a preset corresponding threshold. In other words, a value of the optional first charging measurement parameter is set to the corresponding threshold. For specifics, refer to the foregoing related descriptions and examples in this embodiment, and details are not described herein again.

For example, Table 2 shows a schematic mapping relationship between online charging parameters (online charging parameters corresponding to the online charging quota management mode) or preset values provided in this embodiment of the present disclosure and a preset charging measurement parameter set (including a plurality of first charging measurement parameters).

TABLE 2

| Charging measurement parameter set | |
| --- | --- |
| First charging measurement parameter | Online charging parameter or preset value |
| Time limit parameter | Time quota or time limit threshold |
| Uplink/downlink volume limit parameter | Uplink/downlink volume quota or volume limit threshold |
| Rate change time parameter | Rate change time or rate change time threshold |
| Report threshold parameter | Quota threshold or quota threshold |
| Valid time parameter | Quota validity time or valid time threshold |
| Idle time parameter | Quota holding time or idle time threshold |
| Report indication parameter | Valid value |
| Update indication parameter | Invalid value |

As shown in Table 2, the online charging parameter obtained by the control plane network element includes at least one of the time quota, the uplink/downlink volume quota, the rate change time, the quota threshold, the quota validity time, and the quota holding time. Therefore, a first charging measurement parameter corresponding to an online charging parameter in the charging measurement parameter set shown in Table 2 may be determined based on the online charging parameter. When there is no online charging parameter, in the online charging parameter, corresponding to the first charging measurement parameter in the charging measurement parameter set, the corresponding first charging measurement parameter in the charging measurement parameter set may be determined based on the preset value shown in Table 2.

For example, the time quota, the uplink/downlink volume quota, the rate change time, the quota threshold, the quota validity time, and the quota holding time that are shown in Table 2 are all online charging parameters obtained by the control plane network element; and the time limit threshold, the volume limit threshold, the rate change time threshold, the report threshold, the valid time threshold, the idle time threshold, the valid value, and the invalid value are all preset values.

Table 2 merely shows an example of the mapping relationship between the online charging parameters or preset values and the preset charging measurement parameter set (including a plurality of first charging measurement parameters). A quantity of first charging measurement parameters included in the charging measurement parameter set and a quantity of online charging parameters included in the online charging parameters may be set based on actual use requirements. This is not specifically limited in the present disclosure. In addition, to avoid repetition, for detailed descriptions of the online charging parameters and the charging measurement parameter set, refer to the foregoing related description of the online charging parameters and the charging measurement parameter set in this embodiment.

It should be noted that Table 2 may also be understood as the charging measurement parameter set (including the charging measurement parameter determined by the control plane network element based on the traffic flow charging parameter) sent by the control plane network element to the forwarding plane network element. To be specific, the control plane network element maps the online charging parameters obtained by the control plane network element to the corresponding first charging measurement parameters in the preset charging measurement parameter set, to obtain corresponding second charging measurement parameters (the second charging measurement parameter is a charging measurement parameter obtained after the first charging measurement parameter is assigned a value). These second charging measurement parameters are the charging measurement parameters determined by the control plane network element based on the online charging parameters obtained by the control plane network element. Then, the control plane network element sends the charging measurement parameter set including these charging measurement parameters to the forwarding plane network element for charging measurement.

(III) Online charging envelope generation mode

According to the charging measurement method provided in this embodiment of the present disclosure, when the charging mode is the online charging envelope generation mode, the foregoing charging measurement parameter may include at least one of an uplink/downlink volume limit parameter, a rate change time parameter, a report threshold parameter, a valid time parameter, and an idle time parameter, as well as a time limit parameter.

Correspondingly, the online charging parameter may include at least one of an uplink/downlink volume quota, a rate change time, a quota threshold, a quota validity time, and a quota holding time, as well as a quota consumption time attribute-value pair.

It should be noted that, in the online charging envelope generation mode, the online charging parameter includes at least the quota consumption time attribute-value pair; and correspondingly, the foregoing charging measurement parameter includes at least the time limit parameter.

A value of the uplink/downlink volume limit parameter may be the uplink/downlink volume quota or a volume limit threshold, a value of the rate change time parameter may be the rate change time or a rate change time threshold, a value of the report threshold parameter may be the quota threshold or 0, a value of the valid time parameter may be the quota validity time or a valid time threshold, a value of the idle time parameter value may be the quota holding time or an idle time threshold, and a value of the time limit parameter may be the quota consumption time attribute-value pair.

The volume limit threshold, the rate change time threshold, 0, the valid time threshold, and the idle time threshold are all preset based on actual use requirements. For example, these thresholds may be preset in the control plane network element based on actual use requirements.

Each of the online charging parameters may be referred to as an online charging parameter; and each of the charging measurement parameters may be referred to as a second charging measurement parameter.

It should be noted that, if the online charging parameter obtained by the control plane network element includes an online charging parameter or online charging parameters corresponding to one or some preset first charging measurement parameters, the control plane network element may directly map the online charging parameter to the first charging measurement parameter, that is, setting a value of the first charging measurement parameter to a value of the corresponding online charging parameter, so as to obtain a corresponding second charging measurement parameter. If the online charging parameter obtained by the control plane network element does not include an online charging parameter or online charging parameters corresponding to one or some preset first charging measurement parameters, the control plane network element may map a threshold specified for the first charging measurement parameter to the corresponding first charging measurement parameter, that is, setting a value of the first charging measurement parameter to the corresponding first charging measurement parameter, to obtain a corresponding second charging measurement parameter. In this way, the control plane network element may determine the charging measurement parameter based on the online charging parameter obtained by the control plane network element. The control plane network element may also send the charging measurement parameter set including the charging measurement parameter determined by the control plane network element to the forwarding plane network element for charging measurement.

For example, if the online charging parameter obtained by the control plane network element includes a quota threshold corresponding to a preset report threshold parameter, the control plane network element may directly map the quota threshold to the report threshold parameter, that is, setting a value of the report threshold parameter to a value of the quota threshold. If the online charging parameter obtained by the control plane network element does not include an online charging parameter corresponding to a preset report threshold parameter, the control plane network element may map 0 specified for the report threshold parameter to the report threshold parameter, that is, setting a value of the report threshold parameter to 0.

It should be noted that, for detailed descriptions of the valid time parameter and the idle time parameter, refer to the related description of the valid time parameter and the idle time parameter in (I), and details are not described herein again.

Optionally, the charging measurement parameter may further include at least one of a report indication parameter and an update indication parameter.

A value of the report indication parameter is a preset invalid value, and a value of the update indication parameter is a preset valid value.

The preset valid value and the preset invalid value are preset based on actual use requirements. For example, the valid value and the invalid value may be preset in the control plane network element based on actual use requirements. The valid value may be set to 1 or true, meaning that 1 or true may be used to indicate that the update indication parameter is valid. The invalid value may be set to 0 or false (or non-true), meaning that 0 or may be used to indicate that the report indication parameter is invalid.

Certainly, the valid value may alternatively be set to any other value or identifier that can indicate that the update indication parameter is valid, and the invalid value may alternatively be set to any other value or identifier that can indicate that the report indication parameter is invalid. This is not specifically limited in this embodiment of the present disclosure.

Further, that the report indication parameter is invalid may be understood as that the forwarding plane network element does not need to report, to the control plane network element, the first charging measurement result parameter obtained after the forwarding plane network element performs charging measurement on the traffic flow. For a detailed description about the validity of the update indication parameter, refer to the related description in (I) about the validity of the update indication parameter, and details are not described herein again.

A person skilled in the art can understand that, during implementation of the charging measurement method provided in this embodiment of the present disclosure, if the online charging parameter obtained by the control plane network element is designed to include a parameter, the preset charging measurement parameter set is designed to include at least a first charging measurement parameter corresponding to this parameter, and another first charging measurement parameter in the charging measurement parameter set may be used as an optional first charging measurement parameter to be preset.

For example, if the online charging parameter obtained by the control plane network element is designed to include the quota consumption time attribute-value pair, the preset charging measurement parameter set is designed to include at least the time limit parameter, and other first charging measurement parameters in the preset charging measurement parameter set, such as the uplink/downlink volume limit parameter, the rate change time parameter, the report threshold parameter, the valid time parameter, the idle time parameter, the report indication parameter, and the update indication parameter, may all be used as optional first charging measurement parameters to be preset.

Further, the optional first charging measurement parameter in the charging measurement parameter set may be determined based on a preset corresponding threshold. In other words, a value of the optional first charging measurement parameter is set to the corresponding threshold. For specifics, refer to the foregoing related descriptions and examples in this embodiment, and details are not described herein again.

For example, Table 3 shows a schematic mapping relationship between online charging parameters (online charging parameters corresponding to the online charging envelope generation mode) or preset values provided in this embodiment of the present disclosure and a preset charging measurement parameter set (including a plurality of first charging measurement parameters).

TABLE 3

Charging measurement parameter set

| First charging measurement parameter | Online charging parameter or preset value |
|---|---|
| Time limit parameter | Quota consumption time attribute-value pair |
| Uplink/downlink volume limit parameter | Uplink/downlink volume quota or volume limit threshold |
| Rate change time parameter | Rate change time or rate change time threshold |
| Report threshold parameter | Quota threshold or 0 |
| Valid time parameter | Quota validity time or valid time threshold |
| Idle time parameter | Quota holding time or idle time threshold |
| Report indication parameter | Invalid value |
| Update indication parameter | Valid value |

As shown in Table 3, the online charging parameter obtained by the control plane network element includes at least one of the uplink/downlink volume quota, the rate change time, the quota threshold, the quota validity time, and the quota holding time, as well as the quota consumption time attribute-value pair. Therefore, a first charging measurement parameter corresponding to an online charging parameter in the charging measurement parameter set shown in Table 3 may be determined based on the online charging parameter. When there is no online charging parameter, in the online charging parameter, corresponding to the first charging measurement parameter in the charging measurement parameter set, the corresponding first charging measurement parameter in the charging measurement parameter set may be determined based on the preset value shown in Table 3.

For example, the quota consumption time attribute-value pair, the uplink/downlink volume quota, the rate change time, the quota threshold, the quota validity time, and the quota holding time that are shown in Table 3 are all online charging parameters obtained by the control plane network element. The volume limit threshold, the rate change time threshold, 0, the valid time threshold, the idle time threshold, the valid value, and the invalid value are all preset values.

Table 3 merely shows an example of the mapping relationship between the online charging parameters or preset values and the preset charging measurement parameter set (including a plurality of first charging measurement parameters). A quantity of first charging measurement parameters included in the charging measurement parameter set and a quantity of online charging parameters included in the online charging parameters may be set based on actual use requirements. This is not specifically limited in the present disclosure. In addition, to avoid repetition, for detailed descriptions of the online charging parameters and the charging measurement parameter set, refer to the foregoing related description of the offline charging parameters and the charging measurement parameter set in this embodiment.

It should be noted that Table 3 may also be understood as the charging measurement parameter set (including the charging measurement parameter determined by the control plane network element based on the traffic flow charging parameter) sent by the control plane network element to the forwarding plane network element. To be specific, the control plane network element maps the online charging parameters obtained by the control plane network element to the corresponding first charging measurement parameters in the preset charging measurement parameter set, to obtain corresponding second charging measurement parameters (the second charging measurement parameter is a charging measurement parameter obtained after the first charging measurement parameter is assigned a value). These second charging measurement parameters are the charging measurement parameters determined by the control plane network element based on the online charging parameters obtained by the control plane network element. Then, the control plane network element sends the charging measurement parameter set including these charging measurement parameters to the forwarding plane network element for charging measurement.

Optionally, with reference to FIG. 2, in the charging measurement method provided in this embodiment of the present disclosure, when the charging mode is the offline charging mode, to be specific, when the traffic flow charging parameter is the offline charging parameter, the foregoing S101 may specifically include the following steps.

S101a: The control plane network element obtains a traffic flow charging property.

The foregoing traffic flow charging property may be subscription data of the terminal. The traffic flow charging property may be a file identifier, where the file identifier is used to uniquely identify a configuration file in a P-GW, and the configuration file stores a preconfigured offline charging parameter. Specifically, the control plane network element may obtain, from a home subscriber server (HSS) of the terminal, the subscription data of the terminal, and obtain the traffic flow charging property from the subscription data of the terminal.

S10b: The control plane network element obtains an offline charging parameter based on the traffic flow charging property.

The control plane network element may find the configuration file of the traffic flow charging property identifier in the P-GW based on the traffic flow charging property, and then obtain the preconfigured offline charging parameter from the configuration file.

Optionally, with reference to FIG. 2, in the charging measurement method provided in this embodiment of the present disclosure, when the charging mode is the online charging mode, to be specific, when the traffic flow charging parameter is the online charging parameter, the foregoing S101 may specifically include the following steps.

S101c: The control plane network element receives a quota delivery message sent by the online charging system, where the quota delivery message carries an online charging parameter.

S101d: The control plane network element obtains the online charging parameter based on the quota delivery message.

After the control plane network element receives the quota delivery message sent by the charging system, the control plane network element may directly obtain the online charging parameter from the quota delivery message.

Optionally, the quota delivery message further carries an envelope-report attribute-value pair, and the envelope-report attribute-value pair is used to indicate that the control plane network element reports an online charging measurement result in an envelope form.

Optionally, with reference to FIG. 2, in the charging measurement method provided in this embodiment of the present disclosure, when the charging mode is the online charging mode, to be specific, when the traffic flow charging parameter is the online charging parameter, the foregoing S101 may specifically include the following steps.

S101e: The control plane network element receives an online charging parameter sent by the PCRF.

Alternatively, the foregoing S101e may be replaced by S101f and S101g. In other words, the foregoing S101 may specifically include the following steps.

S101f: The control plane network element obtains a traffic flow charging property.

S101g: The control plane network element obtains an online charging parameter based on the traffic flow charging property.

For descriptions of S101f and S101g, refer to the related descriptions of S101a and S101b in the foregoing embodiment, and details are not described herein again.

According to the charging measurement method provided in this embodiment of the present disclosure, regardless of an online charging mode or an offline charging mode, the control plane network element may determine a corresponding charging measurement parameter based on the obtained traffic flow charging parameter (that is, the online charging parameter or the offline charging parameter). In addition, the charging measurement parameter determined based on the online charging parameter and the charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, the forwarding plane network element may perform charging measurement directly without telling whether an offline charging mode or an online charging mode is used. In other words, the forwarding plane network element may perform charging measurement directly based on the received charging measurement parameter set (the charging measurement parameter in the charging measurement parameter set corresponding to the offline charging mode and the charging measurement parameter in the charging measurement parameter set corresponding to the online charging mode are of a same type). In this way, it can be ensured that an offline charging function and an online charging function are unified at the forwarding plane network element, so that complexity of implementation of the forwarding plane network element and a control interface between the forwarding plane network element and the control plane network element can be reduced.

Figure 5:
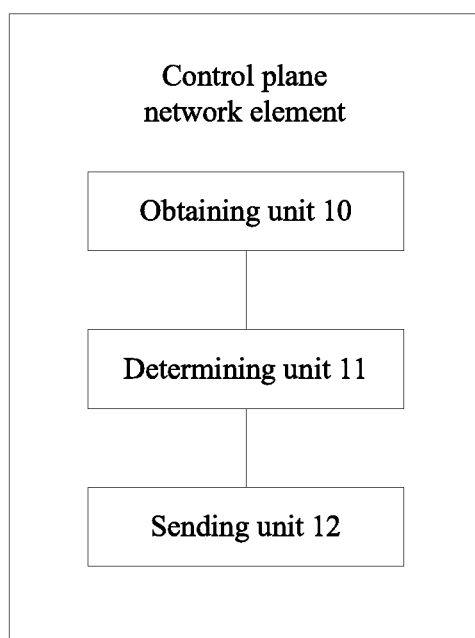
FIG. 5 is schematic structural diagram 1 of a control plane network element according to an embodiment of the present disclosure.

Optionally, as shown in FIG. 5, an embodiment of the present disclosure provides a control plane network element, and the control plane network element may be configured to perform the steps performed by the control plane network element in the foregoing method embodiment. The control plane network element may include modules corresponding to the relevant steps. For example, the control plane network element may include:

an obtaining unit 10, configured to obtain a traffic flow charging parameter, where the traffic flow charging parameter is an online charging parameter or an offline charging parameter; a determining unit 11, configured to determine a charging measurement parameter based on the traffic flow charging parameter obtained by the obtaining unit 10, where a charging measurement parameter determined based on the online charging parameter and a charging measurement parameter determined based on the offline charging parameter are charging measurement parameters in one charging measurement parameter set; and a sending unit 12, configured to send a first message to a forwarding plane network element, where the first message carries a charging measurement parameter set determined by the determining unit 11 and a traffic flow identifier, and the first message is used to trigger the forwarding plane network element to perform, based on the charging measurement parameter set, charging measurement on a traffic flow indicated by the traffic flow identifier.

Figure 6:
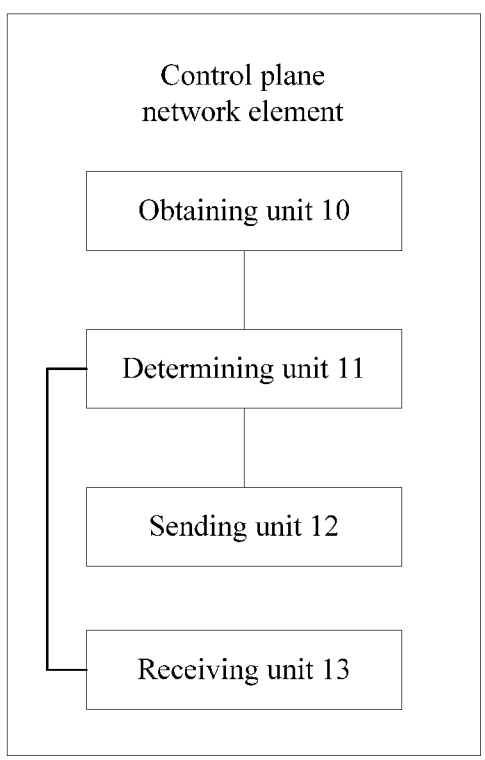
FIG. 6 is schematic structural diagram 2 of a control plane network element according to an embodiment of the present disclosure.

Optionally, with reference to FIG. 5, as shown in FIG. 6, the control plane network element may further include a receiving unit 13.

The receiving unit 13 is configured to receive a second message sent by the forwarding plane network element, where the second message carries a first charging measurement result parameter obtained after the forwarding plane network element performs charging measurement on the traffic flow and a first cause value parameter indicating a cause that has triggered the forwarding plane network element to send the second message.

After the forwarding plane network element performs charging measurement on the traffic flow based on the first message sent by the sending unit of the control plane network element, the forwarding plane network element reports, to the control plane network element by using the second message, a result of the charging measurement performed by the forwarding plane network element, and the control plane network element receives the second message sent by the forwarding plane network element.

Optionally, the determining unit 11 is further configured to generate a third message based on the first charging measurement result parameter and the first cause value parameter that are received by the receiving unit 13, where the third message carries a second charging measurement result parameter, a control plane charging parameter, and a second cause value parameter. The sending unit 12 is further configured to send the third message generated by the determining unit 11 to a charging system.

Optionally, when the traffic flow charging parameter is the offline charging parameter, the charging system is an offline charging system, and the third message is a charging data record request message.

Optionally, when the traffic flow charging parameter is the offline charging parameter, the charging measurement parameter includes at least one of a time limit parameter, an uplink/downlink volume limit parameter, and a rate change time parameter.

Correspondingly, the offline charging parameter includes at least one of a time limit parameter, an uplink/downlink volume limit parameter, and a rate change time parameter.

Optionally, the charging measurement parameter further includes at least one of a report threshold parameter, a valid time parameter, an idle time parameter, a report indication parameter, and an update indication parameter.

When the traffic flow charging parameter is the offline charging parameter, for detailed descriptions of the charging measurement parameter and the offline charging parameter, refer to the related descriptions of the charging measurement parameter and the offline charging parameter in (I) of the foregoing method embodiment, and details are not described herein again.

Optionally, when the traffic flow charging parameter is the online charging parameter, the charging system is an online charging system, the third message is a quota request message, and the third message further carries a quota request parameter.

Optionally, when the traffic flow charging parameter is the online charging parameter, the charging measurement parameter includes at least one of a time limit parameter, an uplink/downlink volume limit parameter, a rate change time parameter, a report threshold parameter, a valid time parameter, and an idle time parameter.

Correspondingly, the online charging parameter includes at least one of a time quota, an uplink/downlink volume quota, a rate change time, a quota threshold, a quota validity time, and a quota holding time.

Optionally, the charging measurement parameter further includes at least one of a report indication parameter and an update indication parameter.

When the traffic flow charging parameter is the online charging parameter, for detailed descriptions of the charging measurement parameter and the online charging parameter, refer to the related descriptions of the charging measurement parameter and the online charging parameter in (II) of the foregoing method embodiment, and details are not described herein again.

Optionally, when the traffic flow charging parameter is the online charging parameter, the charging measurement parameter includes at least one of an uplink/downlink volume limit parameter, a rate change time parameter, a report threshold parameter, a valid time parameter, and an idle time parameter, as well as a time limit parameter.

Correspondingly, the online charging parameter includes at least one of an uplink/downlink volume quota, a rate change time, a quota threshold, a quota validity time, and a quota holding time, as well as a quota consumption time attribute-value pair.

Optionally, the charging measurement parameter further includes at least one of a report indication parameter and an update indication parameter.

When the traffic flow charging parameter is the online charging parameter, for detailed descriptions of the charging measurement parameter and the online charging parameter, refer to the related descriptions of the charging measurement parameter and the online charging parameter in (III) of the foregoing method embodiment, and details are not described herein again.

Optionally, the first cause value parameter is reaching time limit threshold residue, reaching volume limit threshold residue, reaching rate change time threshold, or indication information, where the indication information is used to instruct the forwarding plane network element to send the second message.

Optionally, when the traffic flow charging parameter is the offline charging parameter,
the obtaining unit 10 is specifically configured to obtain a traffic flow charging property and obtain the offline charging parameter based on the traffic flow charging property.

Optionally, when the traffic flow charging parameter is the online charging parameter,
the obtaining unit 10 is specifically configured to receive a quota delivery message sent by the online charging system and obtain the online charging parameter based on the quota delivery message, where the quota delivery message carries the online charging parameter.

It can be understood that the control plane network element provided in this embodiment may be corresponding to the control plane network element in the charging measurement method provided in the embodiment shown in any one of FIG. 2 to FIG. 4, and the division into and/or functions of the modules of the control plane network element provided in this embodiment are intended to implement the method process illustrated in any one of FIG. 2 to FIG. 4. To avoid repetition, for a detailed description about how the control plane network element provided in this embodiment of the present disclosure performs the method process in the foregoing method embodiment, refer to the related description of the foregoing method embodiment, and details are not described herein again.

In one possible implementation of this embodiment of the present disclosure, the obtaining unit 10 and the determining unit 11 may be implemented by using at least one processor in the control plane network element, and the sending unit 12 and receiving unit 13 may be implemented by using a transceiver in the control plane network element (or an independent transmitter and receiver). Specifically, the at least one processor may be implemented by using an independent processing unit or an integrated processing unit. The transceiver may be implemented by using an interface circuit in the control plane network element. These are not specifically limited in this embodiment of the present disclosure.

According to the control plane network element provided in this embodiment of the present disclosure, regardless of an online charging mode or an offline charging mode, the control plane network element may determine a corresponding charging measurement parameter based on the obtained traffic flow charging parameter (that is, the online charging parameter or the offline charging parameter). In addition, the charging measurement parameter determined based on the online charging parameter and the charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, an offline charging function (a charging function corresponding to the offline charging mode) and an online charging function (a charging function corresponding to the online charging mode) can be unified in the forwarding plane network element, so that complexity of implementation of the forwarding plane network element and a control interface between the forwarding plane network element and the apparatus can be reduced.

Figure 7:
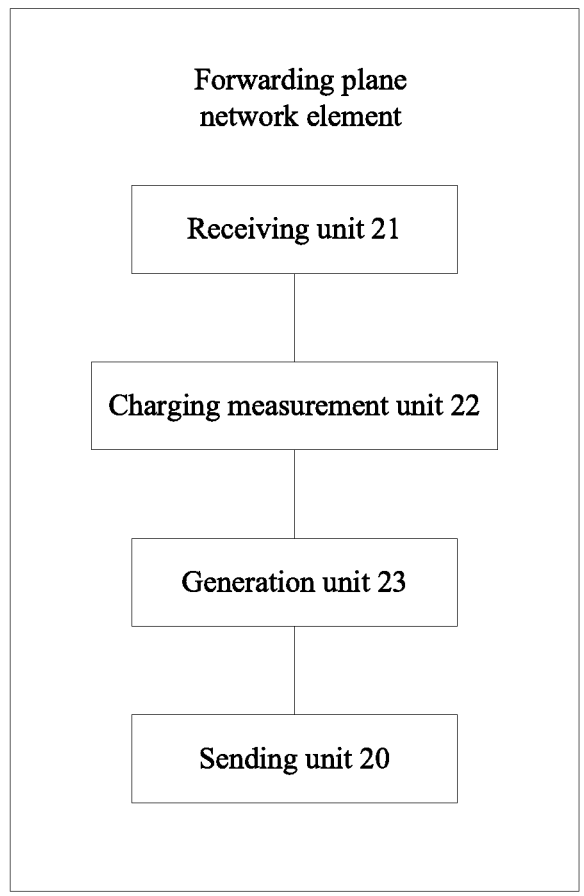
FIG. 7 is a schematic structural diagram of a forwarding plane network element according to an embodiment of the present disclosure.

As shown in FIG. 7, an embodiment of the present disclosure provides a forwarding plane network element, and the forwarding plane network element includes:

a sending unit 20, configured to send a message to a control plane network element, where the message carries a first charging measurement result parameter obtained after the forwarding plane network element performs charging measurement on a traffic flow and a first cause value parameter indicating a value that has triggered the forwarding plane network element to send the message.

Optionally, the first cause value parameter is reaching time limit threshold residue, reaching volume limit threshold residue, reaching rate change time threshold, or indication information. The indication information is used to instruct the forwarding plane network element to send the message.

Optionally, as shown in FIG. 7, the forwarding plane network element in this embodiment of the present disclosure may further include a receiving unit 21, a charging measurement unit 22, a generation unit 23, and the like.

The receiving unit 21 may be configured to receive a first message sent by the control plane network element. The charging measurement unit 22 may perform charging measurement on a traffic flow based on a charging measurement parameter set in the first message received by the receiving unit 21. The generation unit 23 may generate, based on a result of the charging measurement performed by the charging measuring unit 22, the message sent by the sending unit 20.

It can be understood that the forwarding plane network element provided in this embodiment may be corresponding to the forwarding plane network element in the charging measurement method provided in the embodiment shown in any one of FIG. 2 to FIG. 4, and the division into and/or functions of the modules of the forwarding plane network element provided in this embodiment are intended to implement the method process illustrated in any one of FIG. 2 to FIG. 4. To avoid repetition, for a detailed description about how the forwarding plane network element provided in this embodiment of the present disclosure performs the method process in the foregoing method embodiment, refer to the related description of the foregoing method embodiment, and details are not described herein again.

In one possible implementation of this embodiment of the present disclosure, the charging measurement unit 22 and the generation unit 23 may be implemented by using at least one processor in the forwarding plane network element, and the sending unit 20 and receiving unit 21 may be implemented by using a transceiver in the forwarding plane network element (or an independent transmitter and receiver). Specifically, the at least one processor may be implemented by using an independent processing unit or an integrated processing unit. The transceiver may be implemented by using an interface circuit in the forwarding plane network element. These are not specifically limited in this embodiment of the present disclosure.

According to the forwarding plane network element provided in this embodiment of the present disclosure, when a condition indicated by the first cause value parameter is satisfied, the forwarding plane network element sends the second message to the control plane network element, so that the forwarding plane network element sends the second message only when sending the second message is required. In this way, working efficiency of the forwarding plane network element can be improved, and resources of the forwarding plane network element can be saved.

Further, after the forwarding plane network element receives the charging measurement parameter set sent by the control plane network element, the forwarding plane network element may perform charging measurement directly without telling whether an offline charging mode or an online charging mode is used. In other words, the forwarding plane network element may perform charging measurement directly based on the received charging measurement parameter set (the charging measurement parameter in the charging measurement parameter set corresponding to the offline charging mode and the charging measurement parameter in the charging measurement parameter set corresponding to the online charging mode are of a same type). In this way, it can be ensured that an offline charging function and an online charging function are unified at the forwarding plane network element, so that complexity of implementation of the forwarding plane network element and a control interface between the forwarding plane network element and the control plane network element can be reduced.

Figure 8:
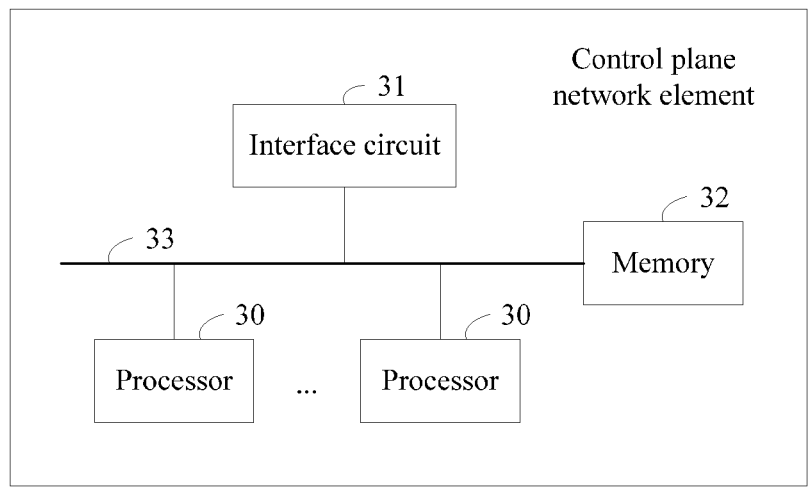
FIG. 8 is a schematic diagram of hardware of a control plane network element according to an embodiment of the present disclosure.

As shown in FIG. 8, an embodiment of the present disclosure provides a control plane network element, and the control plane network element may be configured to perform the steps performed by the control plane network element in the foregoing method embodiment. The control plane network element may include at least one processor 30, an interface circuit 31, a memory 32, and a system bus 33.

The memory 32 is configured to store a computer executable instruction. The at least one processor 30, the interface circuit 31, and the memory 32 are interconnected by using the system bus 33. When the control plane network element runs, the at least one processor 30 executes the computer executable instruction stored in the memory 32, so that the control plane network element executes the charging measurement method according to any one of FIG. 2 to FIG. 4. For a detailed charging measurement method, refer to the related description in the foregoing embodiment shown in any one of FIG. 2 to FIG. 4, and details are not described herein again.

This embodiment further provides a storage medium, and the storage medium may include the memory 32.

The at least one processor 30 may be a central processing unit (CPU). The at least one processor 30 may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or may be any conventional processor, or the like.

The at least one processor 30 may be a dedicated processor, and the dedicated processor may include at least one of a baseband processing chip, a radio frequency processing chip, and the like. Further, the dedicated processor may further include a chip having another dedicated processing function of the control plane network element.

The memory 32 may include a volatile memory such as a random access memory (RAM). The memory 32 may alternatively include a nonvolatile memory such as a read-only memory (ROM), a flash memory, a hard disk drive (HDD), or a solid-state drive (SSD). The memory 32 may alternatively include a combination of the foregoing types of memories.

The system bus 33 may include a data bus, a power bus, a control bus, a signal status bus, and the like. In this embodiment, for clarity of description, various buses are illustrated as the system bus 33 in FIG. 8.

The interface circuit 31 may be specifically a transceiver in the control plane network element (or an independent transmitter and receiver). The at least one processor 30 transmits data to and receives data from another device such as a forwarding plane network element by using the interface circuit 31.

In one possible implementation, the steps in the method process illustrated in any one of FIG. 2 to FIG. 4 may be implemented by the processor 30 in a form of hardware by executing the computer executable instruction that is stored in the memory 32 in a form of software. To avoid repetition, details are not described herein again.

An embodiment of the present disclosure further provides a computer readable storage medium. The computer readable storage medium stores one or more programs. The one or more programs include an instruction. When at least one processor 30 of a control plane network element executes the instruction, the control plane network element executes the charging measurement method according to any one of FIG. 2 to FIG. 4.

An embodiment of the present disclosure further provides a system chip. The system chip may be a system chip in a control plane network element, and the system chip includes at least one processor, an input/output interface, a memory, and a bus.

The memory is configured to store a computer executable instruction. The at least one processor, the memory, and the input/output interface are connected by using the bus. When the system chip runs, the at least one processor executes the computer executable instruction stored in the memory, so that the system chip executes the charging measurement method illustrated in any one of FIG. 2 to FIG. 4.

According to the control plane network element provided in this embodiment of the present disclosure, regardless of an online charging mode or an offline charging mode, the control plane network element may determine the corresponding charging measurement parameter based on the obtained traffic flow charging parameter (that is, the online charging parameter or the offline charging parameter). In addition, the charging measurement parameter determined based on the online charging parameter and the charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, an offline charging function (a charging function corresponding to the offline charging mode) and an online charging function (a charging function corresponding to the online charging mode) can be unified in the forwarding plane network element, so that complexity of implementation of the forwarding plane network element and a control interface between the forwarding plane network element and the apparatus can be reduced.

Figure 9:
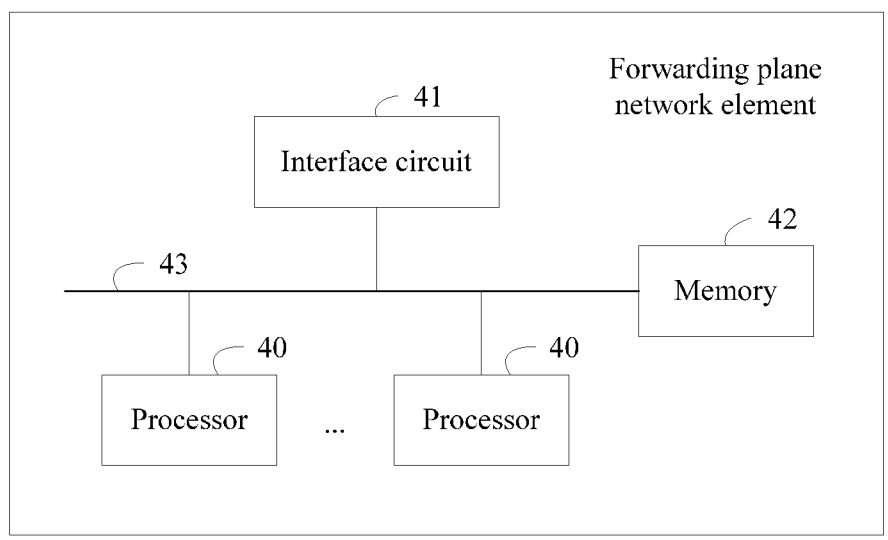
FIG. 9 is a schematic diagram of hardware of a forwarding plane network element according to an embodiment of the present disclosure.

As shown in FIG. 9, an embodiment of the present disclosure provides a forwarding plane network element, and the forwarding plane network element may be configured to perform the steps performed by the forwarding plane network element in the foregoing method embodiment. The forwarding plane network element may include at least one processor 40, an interface circuit 41, a memory 42, and a system bus 43.

The memory 42 is configured to store a computer executable instruction. The at least one processor 40, the interface circuit 41, and the memory 42 are interconnected by using the system bus 43. When the forwarding plane network element runs, the at least one processor 40 executes the computer executable instruction stored in the memory 42, so that the forwarding plane network element executes the charging measurement method according to any one of FIG. 2 to FIG. 4. For a detailed charging measurement method, refer to the related description in the foregoing embodiment shown in any one of FIG. 2 to FIG. 4, and details are not described herein again.

This embodiment further provides a storage medium, and the storage medium may include the memory 42.

The at least one processor 40 may be a CPU. The at least one processor 40 may alternatively be another general-purpose processor, a DSP, an ASIC, an FPGA or another programmable logic device, a discrete gate or a transistor logic device, a discrete hardware component, or the like. The general-purpose processor may be a microprocessor, or may be any conventional processor, or the like.

The at least one processor 40 may be a dedicated processor, and the dedicated processor may include at least one of a baseband processing chip, a radio frequency processing chip, and the like. Further, the dedicated processor may further include a chip having another dedicated processing function of the forwarding plane network element.

The memory 42 may include a volatile memory such as a RAM. The memory 42 may alternatively include a non-volatile memory such as a ROM, a flash memory, an HDD, or an SSD. The memory 42 may alternatively include a combination of the foregoing types of memories.

The system bus 43 may include a data bus, a power bus, a control bus, a signal status bus, and the like. In this embodiment, for clarity of description, various buses are illustrated as the system bus 43 in FIG. 9.

The interface circuit 41 may be specifically a transceiver in the forwarding plane network element (or an independent transmitter and receiver). The at least one processor 40 transmits data to and receives data from another device such as a control plane network element by using the interface circuit 41.

In one possible implementation, the steps in the method process illustrated in any one of FIG. 2 to FIG. 4 may be implemented by the processor 40 in a form of hardware by executing the computer executable instruction that is stored in the memory 42 in a form of software. To avoid repetition, details are not described herein again.

An embodiment of the present disclosure further provides a computer readable storage medium. The computer readable storage medium stores one or more programs. The one or more programs include an instruction. When the at least one processor 40 of the forwarding plane network element executes the instruction, the forwarding plane network element executes the charging measurement method according to any one of FIG. 2 to FIG. 4.

An embodiment of the present disclosure further provides a system chip. The system chip may be a system chip in a forwarding plane network element, and the system chip includes at least one processor, an input/output interface, a memory, and a bus.

The memory is configured to store a computer executable instruction. The at least one processor, the memory, and the input/output interface are connected by using the bus. When the system chip runs, the at least one processor executes the computer executable instruction stored in the memory, so that the system chip executes the charging measurement method illustrated in any one of FIG. 2 to FIG. 4.

According to the forwarding plane network element provided in this embodiment of the present disclosure, when a condition indicated by the first cause value parameter is satisfied, the forwarding plane network element sends the second message to the control plane network element, so that the forwarding plane network element sends the second message only when sending the second message is required. In this way, working efficiency of the forwarding plane network element can be improved, and resources of the forwarding plane network element can be saved.

Further, after the forwarding plane network element receives the charging measurement parameter set sent by the control plane network element, the forwarding plane network element may perform charging measurement directly without telling whether an offline charging mode or an online charging mode is used. In other words, the forwarding plane network element may perform charging measurement directly based on the received charging measurement parameter set (the charging measurement parameter in the charging measurement parameter set corresponding to the offline charging mode and the charging measurement parameter in the charging measurement parameter set corresponding to the online charging mode are of a same type). In this way, it can be ensured that an offline charging function and an online charging function are unified at the forwarding plane network element, so that complexity of implementation of the forwarding plane network element and a control interface between the forwarding plane network element and the control plane network element can be reduced.

An embodiment of the present disclosure provides a charging measurement system. The system may include the control plane network element and the forwarding plane network element that are provided in the embodiments of the present disclosure. For a detailed description of the control plane network element, refer to the related description of the control plane network element in the embodiment shown in FIG. 5, FIG. 6, or FIG. 8. For a detailed description of the forwarding plane network element, refer to the related description of the forwarding plane network element in the embodiment shown in FIG. 7 or FIG. 9. Details are not repeated herein.

For example, as shown in FIG. 1, FIG. 1 is a schematic diagram of an architecture of a charging measurement system according to an embodiment of the present disclosure. The charging measurement system includes a terminal 1, a base station 2, a control plane network element 3, a forwarding plane network element 4, an offline charging system 5, and an online charging system 6. For a detailed description of the charging measurement system, refer to the related description of the embodiment shown in FIG. 1, and details are not described herein again.

According to the charging measurement system provided in this embodiment of the present disclosure, regardless of an online charging mode or an offline charging mode, the control plane network element may determine the corresponding charging measurement parameter based on the obtained traffic flow charging parameter (that is, the online charging parameter or the offline charging parameter). In addition, the charging measurement parameter determined based on the online charging parameter and the charging measurement parameter determined based on the offline charging parameter are charging measurement parameters in one charging measurement parameter set. In other words, the control plane network element may determine charging measurement parameters of a same type based on the online charging parameter and the offline charging parameter, and send the charging measurement parameter set including the charging measurement parameter to the forwarding plane network element for charging measurement. Therefore, the forwarding plane network element may perform charging measurement directly without telling whether an offline charging mode or an online charging mode is used. In other words, the forwarding plane network element may perform charging measurement directly based on the received charging measurement parameter set (the charging measurement parameter in the charging measurement parameter set corresponding to the offline charging mode and the charging measurement parameter in the charging measurement parameter set corresponding to the online charging mode are of a same type). In this way, it can be ensured that an offline charging function and an online charging function are unified at the forwarding plane network element, so that complexity of implementation of the forwarding plane network element and a control interface between the forwarding plane network element and the control plane network element can be reduced.

The foregoing descriptions about implementations allow a person skilled in the art to understand that, for the purpose of convenient and brief description, the division into the foregoing function modules is used as an example for illustration. In actual application, the foregoing functions can be allocated to different modules and implemented as required, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be in electronic, mechanical, or other forms.

The units described as separate parts may or may not be physically separate. Parts displayed as units may or may not be physical units, and may be located in one position or distributed on a plurality of network units. Some or all of the units may be selected depending on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific embodiments and exemplary implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A charging measurement method, comprising:
   obtaining, by a control plane network element, a traffic flow charging parameter, wherein the traffic flow charging parameter is an online charging parameter or an offline charging parameter;
   determining, by the control plane network element, a charging measurement parameter based on the traffic flow charging parameter, wherein a charging measurement parameter determined based on the online charging parameter and a charging measurement parameter determined based on the offline charging parameter are charging measurement parameters in one charging measurement parameter set, wherein the one charging measurement parameter set in the control plane network element is preset and comprises one or more charging measurement parameters, and wherein the control plane network element maps the obtained traffic flow charging parameter to a corresponding charging measurement parameter in the charging measurement parameter set to obtain the charging measurement parameter; and
   sending, by the control plane network element, a first message to a forwarding plane network element, wherein the first message carries the charging measurement parameter set and a traffic flow identifier, and the first message is used to trigger the forwarding plane network element to perform, based on the charging measurement parameter set, charging measurement on a traffic flow indicated by the traffic flow identifier.

2. The method according to claim 1, wherein after sending the first message, the method further comprises:
   receiving, by the control plane network element, a second message from the forwarding plane network element, wherein the second message carries a first charging measurement result parameter obtained after the forwarding plane network element performs charging measurement on the traffic flow and a first cause value parameter indicating a cause that has triggered the forwarding plane network element to send the second message.

3. The method according to claim 2, wherein after receiving the second message, the method further comprises:
   generating, by the control plane network element, a third message based on the first charging measurement result parameter and the first cause value parameter, wherein the third message carries a second charging measurement result parameter, a control plane charging parameter, and a second cause value parameter; and
   sending, by the control plane network element, the third message to a charging system.

4. The method according to claim 1, wherein
   when the traffic flow charging parameter is the offline charging parameter, the charging measurement parameter comprises at least one of a time limit parameter, an uplink/downlink volume limit parameter, and a rate change time parameter.

5. The method according to claim 4, wherein
   the charging measurement parameter further comprises at least one of a report threshold parameter, a valid time parameter, an idle time parameter, a report indication parameter, and an update indication parameter.

6. The method according to claim 1, wherein
   when the traffic flow charging parameter is the online charging parameter, the charging measurement parameter comprises at least one of a time limit parameter, an uplink/downlink volume limit parameter, a rate change time parameter, a report threshold parameter, a valid time parameter, and an idle time parameter.

7. The method according to claim 6, wherein
   the charging measurement parameter further comprises at least one of a report indication parameter and an update indication parameter.

8. The method according to claim 1, wherein
   when the traffic flow charging parameter is the online charging parameter, the charging measurement parameter comprises at least one of an uplink/downlink volume limit parameter, a rate change time parameter, a report threshold parameter, a valid time parameter, and an idle time parameter, as well as a time limit parameter.

9. The method according to claim 8, wherein
   the charging measurement parameter further comprises at least one of a report indication parameter and an update indication parameter.

10. A control plane network element, comprising:
    a processor, configured to:
      obtain a traffic flow charging parameter, wherein the traffic flow charging parameter is an online charging parameter or an offline charging parameter, and
      determine a charging measurement parameter based on the traffic flow charging parameter, wherein a charging measurement parameter determined based on the online charging parameter and a charging measurement parameter determined based on the offline charging parameter are charging measurement parameters in one charging measurement parameter set, wherein the one charging measurement parameter set in the control plane network element is preset and comprises one or more charging measurement parameters, and wherein the control plane network element maps the obtained traffic flow charging parameter to a corresponding charging measurement parameter in the charging measurement parameter set to obtain the charging measurement parameter; and
    a transmitter, configured to send a first message to a forwarding plane network element, wherein the first message carries the charging measurement parameter set and a traffic flow identifier, and the first message is used to trigger the forwarding plane network element to perform, based on the charging measurement parameter set, charging measurement on a traffic flow indicated by the traffic flow identifier.

11. The control plane network element according to claim 10, wherein the control plane network element further comprises a receiver, wherein the receiver is configured to receive a second message from the forwarding plane network element, wherein the second message carries a first charging measurement result parameter obtained after the forwarding plane network element performs charging measurement on the traffic flow and a first cause value parameter indicating a cause that has triggered the forwarding plane network element to send the second message.

12. The control plane network element according to claim 11, wherein the processor is further configured to generate a third message based on the first charging measurement result parameter and the first cause value parameter, wherein the third message carries a second charging measurement result parameter, a control plane charging parameter, and a second cause value parameter; and the transmitter is configured to send the third message to a charging system.

13. The control plane network element according to claim 10, wherein when the traffic flow charging parameter is the offline charging parameter, the charging measurement parameter comprises at least one of a time limit parameter, an uplink/downlink volume limit parameter, and a rate change time parameter.

14. The control plane network element according to claim 13, wherein the charging measurement parameter further comprises at least one of a report threshold parameter, a valid time parameter, an idle time parameter, a report indication parameter, and an update indication parameter.

15. The control plane network element according to claim 10, wherein when the traffic flow charging parameter is the online charging parameter, the charging measurement parameter comprises at least one of a time limit parameter, an uplink/downlink volume limit parameter, a rate change time parameter, a report threshold parameter, a valid time parameter, and an idle time parameter.

16. The control plane network element according to claim 15, wherein the charging measurement parameter further comprises at least one of a report indication parameter and an update indication parameter.

17. The control plane network element according to claim 10, wherein when the traffic flow charging parameter is the online charging parameter, the charging measurement parameter comprises at least one of an uplink/downlink volume limit parameter, a rate change time parameter, a report threshold parameter, a valid time parameter, and an idle time parameter, as well as a time limit parameter.

18. The control plane network element according to claim 17, wherein the charging measurement parameter further comprises at least one of a report indication parameter and an update indication parameter.

19. A non-transitory computer readable storage medium having instructions stored thereon, which when executed by at least one processor of a control plane network element, causes the control plane network element to perform one or more operations for a charging measurement method, the one or more operations comprising:

obtaining, by the control plane network element, a traffic flow charging parameter, wherein the traffic flow charging parameter is an online charging parameter or an offline charging parameter;

determining, by the control plane network element, a charging measurement parameter based on the traffic flow charging parameter, wherein a charging measurement parameter determined based on the online charging parameter and a charging measurement parameter determined based on the offline charging parameter are charging measurement parameters in one charging measurement parameter set, wherein the one charging measurement parameter set in the control plane network element is preset and comprises one or more charging measurement parameters, and wherein the control plane network element maps the obtained traffic flow charging parameter to a corresponding charging measurement parameter in the charging measurement parameter set to obtain the charging measurement parameter; and sending, by the control plane network element, a first message to a forwarding plane network element, wherein the first message carries the charging measurement parameter set and a traffic flow identifier, and the first message is used to trigger the forwarding plane network element to perform, based on the charging measurement parameter set, charging measurement on a traffic flow indicated by the traffic flow identifier.

20. The non-transitory computer readable storage medium according to claim 19, wherein after sending the first message, the operations further comprise:

receiving, by the control plane network element, a second message from the forwarding plane network element, wherein the second message carries a first charging measurement result parameter obtained after the forwarding plane network element performs charging measurement on the traffic flow and a first cause value parameter indicating a cause that has triggered the forwarding plane network element to send the second message.

* * * * *

UNITED STATES PATENT AND TRADEMARK OFFICE
CERTIFICATE OF CORRECTION

PATENT NO. : 10,536,585 B2
APPLICATION NO. : 16/110962
DATED : January 14, 2020
INVENTOR(S) : Hui Ni and Yongcui Li Page 1 of 1

It is certified that error appears in the above-identified patent and that said Letters Patent is hereby corrected as shown below:

In the Claims

Claim 19, Column 44, Line 29, replace the word "clement" with the word "element"

Signed and Sealed this
Twenty-ninth Day of December, 2020

Andrei Iancu
*Director of the United States Patent and Trademark Office*